United States Patent
Bharitkar et al.

(10) Patent No.: US 9,349,378 B2
(45) Date of Patent: May 24, 2016

(54) HAPTIC SIGNAL SYNTHESIS AND TRANSPORT IN A BIT STREAM

(71) Applicant: Dolby Laboratories Licensing Corporation, San Francisco, CA (US)

(72) Inventors: Sunil Bharitkar, Los Angeles, CA (US); Jeffrey Riedmiller, Penngrove, CA (US); C. Phillip Brown, Castro Valley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 30 days.

(21) Appl. No.: 14/536,755

(22) Filed: Nov. 10, 2014

(65) Prior Publication Data
US 2015/0154966 A1 Jun. 4, 2015

Related U.S. Application Data

(60) Provisional application No. 61/906,064, filed on Nov. 19, 2013, provisional application No. 61/906,345, filed on Nov. 19, 2013.

(51) Int. Cl.
*H04R 5/00* (2006.01)
*G10L 19/008* (2013.01)
(Continued)

(52) U.S. Cl.
CPC ............ *G10L 19/008* (2013.01); *G08B 6/00* (2013.01); *G10L 21/16* (2013.01)

(58) Field of Classification Search
CPC .................................................. G10L 19/008
USPC .................................. 381/22–23; 340/407.1
See application file for complete search history.

(56) References Cited

U.S. PATENT DOCUMENTS 7,680,451 B2 * 3/2010 Roy ..................... H04N 21/235
                                                              348/460
7,911,328 B2 * 3/2011 Luden ..................... G06F 3/016
                                                              310/37

(Continued)

FOREIGN PATENT DOCUMENTS

WO   2014/113465   7/2014
WO   2014/124377   8/2014

OTHER PUBLICATIONS

Wells, W.D. "Three Useful Ideas" in R.J. Lutz (Ed.), Advances in Consumer Research, 13, pp. 9-12, Provo, UT: Associate for Consumer Research, 1986.

(Continued)

*Primary Examiner* — Disler Paul

(57) ABSTRACT

Techniques for synthesizing a parameterized haptic track from a multichannel audio signal and embedding the haptic track in a multichannel audio codec bit stream. The haptic track synthesis can occur while encoding the multichannel audio signal as the multichannel audio codec bit stream. The haptic track can be synthesized in a way that allows select parameters of the haptic track to be extracted from the audio signal. The parameters can be adjusted by a user during the encoding process. For example, the parameter adjustments can be made using a authoring/monitoring tool. The parameter adjustments can be recorded as metadata that, along with the haptic track, is included in the codec bit stream. In some aspects the present technology, the adjustable parameters include center frequency, gain, decay rate, and other parameters that allow for modulation of the haptic track during decoding of the codec bit stream. By synthesizing a parameterized haptic track, A/V content creators can be provided greater control in authoring haptic content to accompany the A/V content they create.

19 Claims, 17 Drawing Sheets

(51) Int. Cl.
*G08B 6/00* (2006.01)
*G10L 21/16* (2013.01)

(56) References Cited

U.S. PATENT DOCUMENTS

| | | |
|---|---|---|
| 8,000,825 B2 | 8/2011 | Ullrich |
| 2009/0096632 A1 | 4/2009 | Ullrich |
| 2012/0306631 A1 | 12/2012 | Hughes |
| 2013/0106691 A1 | 5/2013 | Rank |
| 2013/0246077 A1 | 9/2013 | Riedmiller |
| 2013/0265286 A1 | 10/2013 | Da Costa |
| 2014/0347177 A1* | 11/2014 | Phan ............... H04N 21/234336 340/407.1 |
| 2015/0109220 A1* | 4/2015 | Yliaho ................... G06F 3/016 345/173 |

OTHER PUBLICATIONS

ISO/IEC 14496-3.
ISO/IEC 13818-3.
Wirth, et al. "A Process Model of the Formation of Spatial Presence Experiences" Media Psychology, vol. 9.3, Dec. 5, 2007.

* cited by examiner

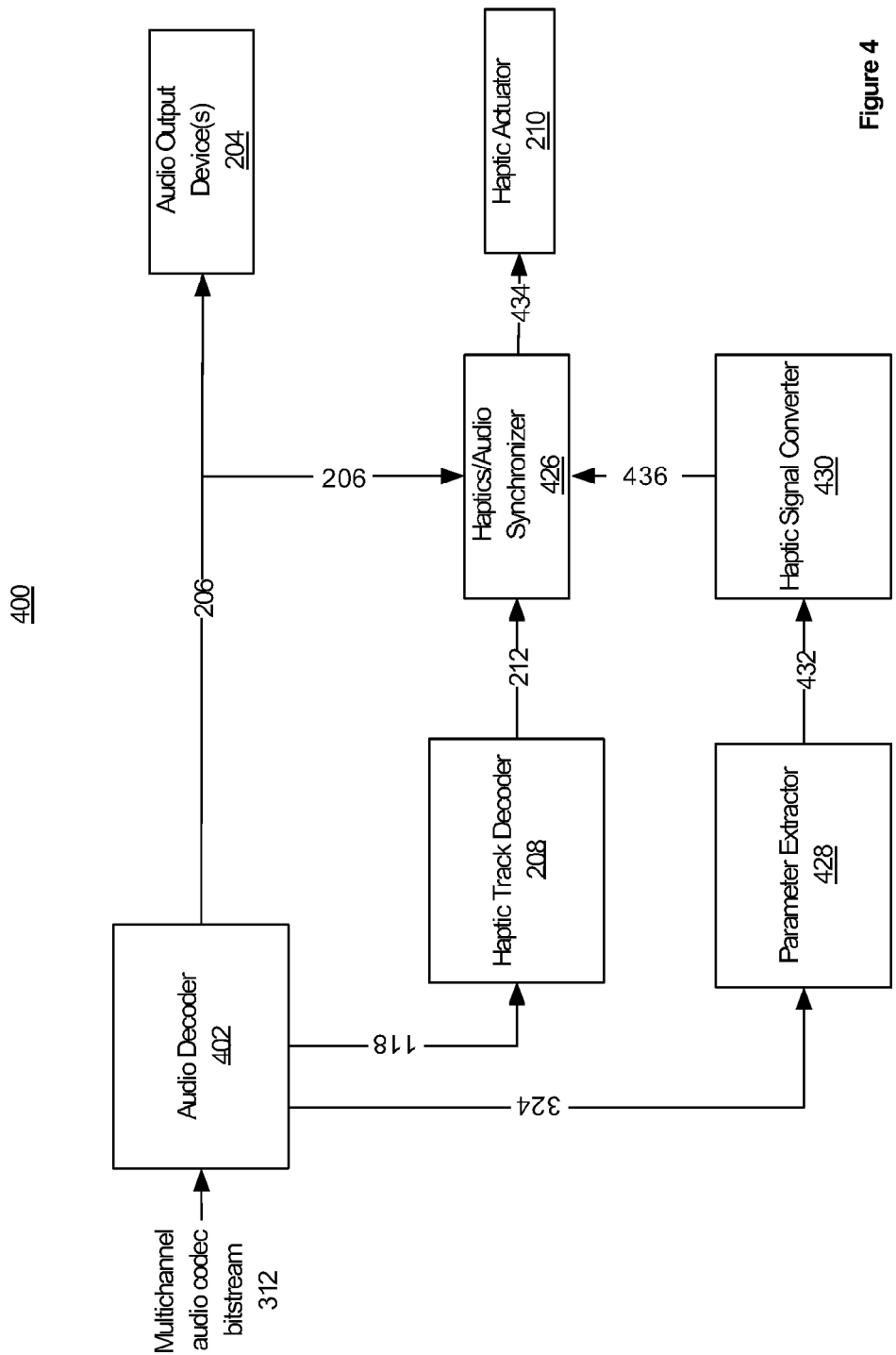

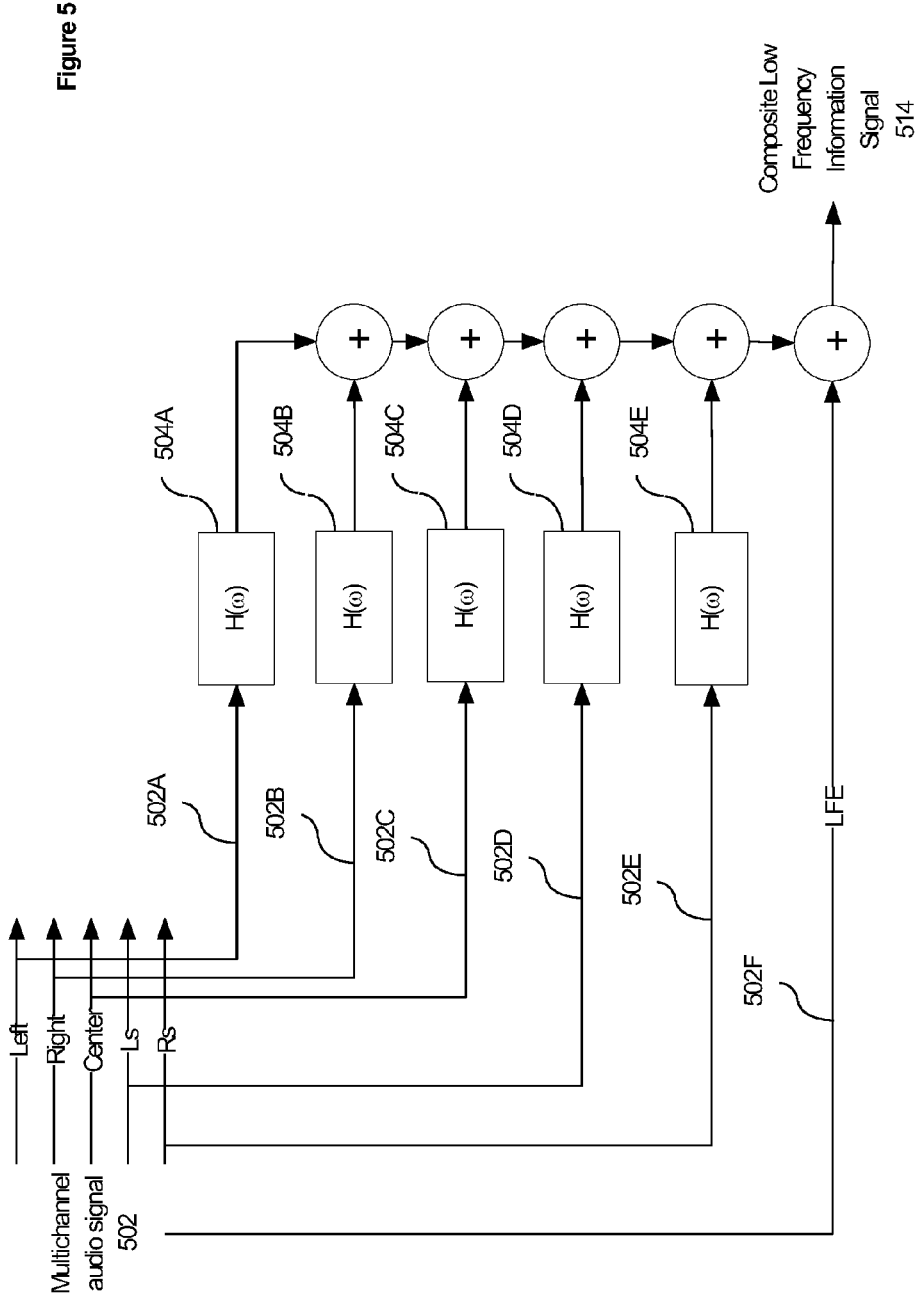

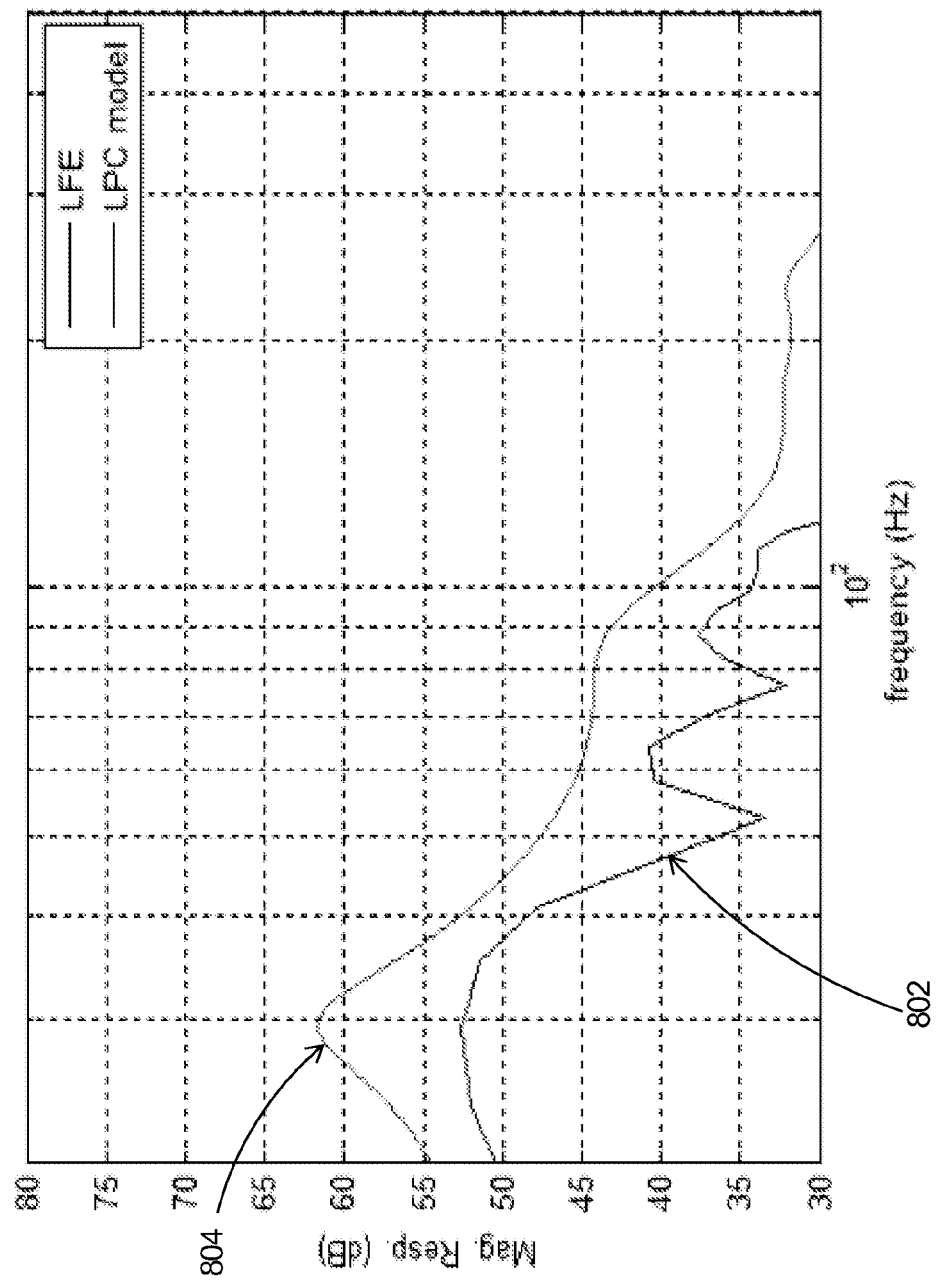

HAPTIC SIGNAL SYNTHESIS AND TRANSPORT IN A BIT STREAM

CROSS-REFERENCE TO RELATED APPLICATIONS

This application claims the benefit of priority to U.S. Provisional Application Ser. No. 61/906,064, entitled "Haptic Signal Synthesis and Transport in a Bit Stream," filed on Nov. 19, 2013, and U.S. Provisional Application Ser. No. 61/906,345, entitled "Haptic Signal Synthesis and Transport in a Bit Stream," filed on Nov. 19, 2013, which are incorporated herein by reference in its entirely.

This application is related to each of the following applications, the entire contents of each of which is hereby incorporated by reference as if fully set forth herein: U.S. Pat. Appln. No. 61/824,010, entitled "AUDIO ENCODER AND DECODER WITH PROGRAM BOUNDARY METADATA AND PROCESSING STATE METADATA", filed May 16, 2013; U.S. patent application Ser. No. 13/989,256, entitled "ADAPTIVE PROCESSING WITH MULTIPLE MEDIA PROCESSING NODES", filed May 23, 2013; U.S. Pat. Appln. No. 61/836,865, entitled "AUDIO ENCODER AND DECODER WITH PROGRAM INFORMATION OR SUB-STREAM STRUCTURE METADATA", filed Jun. 19, 2013; and U.S. Pat. Appln. No. 61/889,131, entitled "AUDIO BITSTREAMS WITH SUPPLEMENTARY DATA AND ENCODING AND DECODING OF SUCH BITSTREAMS", filed Oct. 10, 2013.

TECHNOLOGY

The present technology relates generally to haptics, and in particular, to synthesizing a haptic signal from a multichannel audio signal and transporting the haptic signal in a multichannel audio codec bit stream.

BACKGROUND

Haptic effects (sometimes referred to as touch or tactile feedback) can be produced by haptic actuators, or motors designed to create haptic sensations such as vibrations. Haptic sensations can be created in consumer electronic devices, such as smart phones, tablet computers, and other mobile computing devices, by haptic actuators embedded in the devices. For example, embedded software in a smart phone can cause a haptic signal to be sent to a haptic actuator when a phone call is received thereby causing the phone to vibrate and alert a user of the phone of the incoming call. The haptic signal can be represented as an 8-bit, 8 kilohertz (kHz) audio signal, for example.

Audio content, such as music, and audio/visual (A/V) content, such as movies, can be haptically enhanced to a create a multimodal experience for consumers. Techniques exist for automatically generating haptic feedback based on an analysis of an audio signal. For example, techniques exist in mobile computing devices for automatically generating haptic signals based on audio signals output by device applications such as, for example, gaming applications or short-form video applications. The generated haptic signals are sent to haptic actuators in the devices to provide haptic accompaniment to the A/V content output by the applications.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present technology is illustrated by way of example, and not by way of limitation, in the figures of the accompanying drawings and in which like reference numerals refer to similar elements and in which:

FIG. 4 illustrates a technique for decoding a multichannel audio codec bit stream produced in accordance with the embodiment of FIG. 3.

FIG. 5 is a block diagram illustrating components for generating a composite low frequency information signal from a multichannel audio signal, according to an embodiment of the present technology.

FIG. 8A and FIG. 8B provides an example plots relating to extracting haptic effect parameters from an LFE channel signal.

DESCRIPTION OF EXAMPLE POSSIBLE EMBODIMENTS

Figure 1:
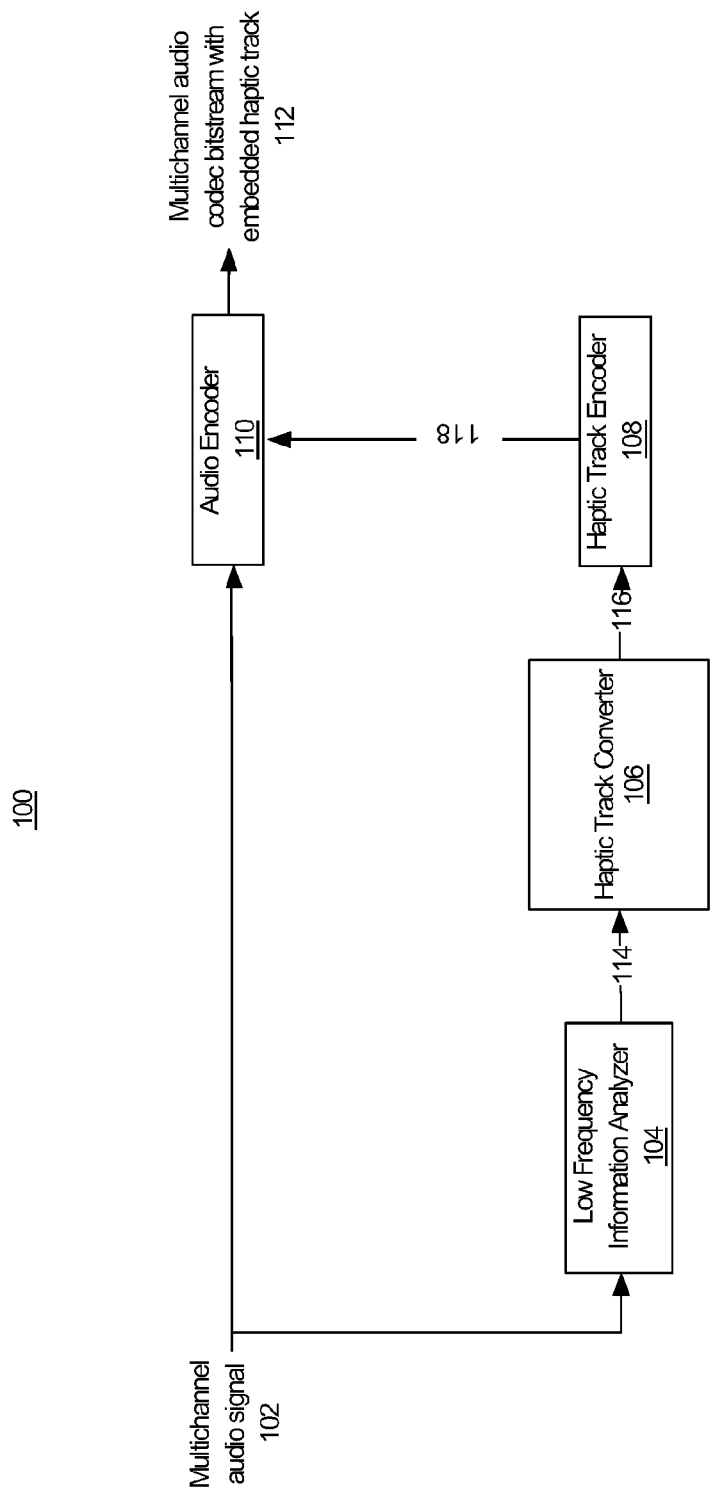
FIG. 1 illustrates a first embodiment of a technique for synthesizing a haptic track from a multichannel audio signal and embedding the synthesized haptic track in a multichannel audio codec bit stream.

Example possible embodiments, which relate to synthesizing a haptic signal from a multichannel audio signal and transporting the haptic signal in a multichannel audio codec bit stream, are described herein. In the following description, for the purposes of explanation, numerous specific details are set forth in order to provide a thorough understanding of the present technology. It will be apparent, however, that the present technology may be practiced without these specific details. In other instances, well-known structures and devices are not described in exhaustive detail, in order to avoid unnecessarily occluding, obscuring, or obfuscating the present technology.

Example embodiments are described herein according to the following outline:

1. GLOSSARY
2. GENERAL OVERVIEW
3. A FIRST HAPTIC TRACK SYNTHESIS EMBODIMENT
4. A FIRST DECODING EMBODIMENT
5. A SECOND HAPTIC TRACK SYNTHESIS EMBODIMENT
6. A SECOND DECODING EMBODIMENT
7. COMPOSITE LOW FREQUENCY INFORMATION SIGNAL
8. HAPTIC TRACK SYNTHESIS
8.1 A FIRST HAPTIC TRACK SYNTHESIS EMBODIMENT
8.2 A SECOND HAPTIC TRACK SYNTHESIS EMBODIMENT
9. ADDITIONAL HAPTIC EFFECT PARAMETERS
10. CARRIAGE OF HAPTIC EFFECT METADATA IN AUDIO CODEC BIT STREAM
11. EXAMPLE IMPLEMENTING MECHANISM

1. Glossary

Audio/Visual (A/V) Content—Refers to audio content alone (e.g., music, speech, etc.), visual content alone (e.g., images, video, animation, etc.), and a combination of audio and video content (e.g. television program, movies, short-form video, etc.).

Audio Decoder—Refers to any electronic device or computer program capable of decoding a multichannel audio codec bit stream to a digital or analog multichannel audio signal. An audio decoder often includes a digital-to-analog converter (ADC) or a digital-to-digital converter (DDC) for converting the bit stream to the audio signal.

Audio Encoder (or Audio Codec)—Refers to an electronic device or computer program capable of coding a digital or analog multichannel audio signal as a multichannel audio codec bit stream. An audio encoder often includes an analog-to-digital converter (ADC) or a digital-to-digital converter (DDC) for converting the audio signal to the bit stream.

Haptic Actuator—Refers to a combination of electromotor components for producing a haptic effect. Non-limiting examples of a haptic actuator include an eccentric rotating mass (ERM) motor, a linear resonant actuator (LRA), and a piezoelectric actuator.

Haptic Effect—Is a physical force, vibration, or motion applied to a user or a device by a haptic actuator. A haptic effect is sometimes referred to herein as haptic feedback.

Haptic Signal—Refers to a signal, digital or analog, compressed or not compressed, for controlling a haptic actuator to produce a haptic effect. A haptic signal is sometimes referred herein as a haptic track.

Multichannel audio codec bit stream—Refers to a digital data stream produced by an audio encoder and containing more than one audio channel of digital audio data. The bit stream may also contain other types of channels such as, for example, a video channel, a metadata channel, and/or or a haptic track channel.

Multichannel audio signal—Refers to a signal, digital or analog, representing more than one channel of audio.

2. General Overview

This overview presents a basic description of some aspects of a possible embodiment of the present technology. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

In one aspect of the present technology, techniques are provided for synthesizing a parameterized haptic track from a multichannel audio signal and embedding the haptic track in a multichannel audio codec bit stream. The haptic track synthesis can occur while encoding the multichannel audio signal as the multichannel audio codec bit stream. The haptic track can be synthesized in a way that allows select parameters of the haptic track to be extracted from the audio signal. The parameters can be adjusted by a user during the encoding process. For example, the parameter adjustments can be made using a authoring/monitoring tool. The parameter adjustments can be recorded as metadata that, along with the haptic track, is embedded in the codec bit stream.

In some aspects of the present technology, the present technology, the adjustable parameters include center frequency, gain, decay rate, and other parameters that allow for modulation of the haptic track during decoding of the codec bit stream. By synthesizing a parameterized haptic track, A/V content creators can be provided greater control in authoring haptic content to accompany the A/V content they create.

In some aspects of the present technology, the haptic track parametric synthesis may be generalized enough to encompass a superset of parameters that can be appropriately decoded at a decoder on a decoding device for driving at least one of a variety of haptic actuators (e.g., rotating motor, linear-resonant actuator LRA, piezo-haptic transducer, etc.). The decoding device may have one or more than one type of haptic actuator and these could be spatially located on the device. Additionally, the parameters used for representing haptic information may include a spatial position parameter to trigger a corresponding spatially located haptic actuator on the device.

In some embodiments of the present technology, the synthesized haptic track is embedded as a monaural haptic track channel in the multichannel audio codec bit stream. The monaural haptic track channel can be compressed version of the synthesized haptic track. Beneficially, the codec bit stream with the embedded monaural haptic track channel and associated parameter adjustment metadata can be used to digitally transport authored haptic content along with the A/V content it accompanies to a playback device with relatively minimal increase to the overall bit rate of the codec bit stream.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

3. A First Haptic Track Synthesis Embodiment

In some embodiments, the present technology includes techniques for automatic synthesis of a haptic track from a multichannel audio signal. The multichannel audio signal can be a digital or analog signal. The haptic track can be synthesized from low frequency information in the multichannel audio signal. For example, the haptic track can be synthesized from a low frequency effects (LFE) channel of the multichannel audio signal. The low frequency information can include deep, low pitched sounds ranging from 3 to 120 Hertz (Hz), for example.

The multichannel audio signal can contain other audio information in addition to low frequency information. For example, the multichannel audio signal can contain other surround sound information in addition to low frequency information. The additional surround sound information can contain information for one or more of the following surround sound channels: a center channel, a left front channel, a right front channel, a left back channel, a right back channel, a left surround channel, a right surround channel, a left surround/back channel, and a right surround/back channel. The multichannel audio signal can contain still other additional channels such as, for example, one or more channels for height or one or more objects.

Turning now to FIG. 1, it illustrates a technique 100 for synthesizing haptic track 116/118 from multichannel audio signal 102 according to an embodiment of the present technology. Compressed haptic track 118 is produced from uncompressed haptic track 116 and compressed haptic track 118 is embedded in multichannel audio codec bit stream 112. In other embodiments, uncompressed haptic track 116 is embedded in multichannel audio codec bit stream 112 instead of compressed haptic track 116. In some embodiments, technique 100 is performed by a computing device or computing devices used by a A/V content creator such as, for example, an A/V content creator for a movie studio, music studio, or other professional A/V content creator.

Technique 100 involves various components including low frequency information analyzer 104, haptic track converter 106, haptic track encoder 108, and audio encoder 110. The components may be implemented to perform the functions described herein in software, hardware, or a combination of hardware and software, according to the requirements of the particular implementation at hand.

As shown, multichannel audio signal 102 is input to audio encoder 110 and low frequency information analyzer 104. Audio encoder 110 can be a conventional multichannel audio encoder with modifications for embedding compressed haptic track 118 or uncompressed haptic track 116 as a substream of multichannel audio codec bit stream 112. For example, audio encoder 110 can embed uncompressed haptic track 116 or compressed haptic track 118 as a monaural channel of multichannel audio codec bit stream 112.

Low frequency information analyzer 104 produces low frequency information audio signal 114 from input multichannel audio signal 102. In some embodiments, low frequency information audio signal 114 carries deep, low-pitched sounds ranging from 3 Hz to 200 Hz. In some embodiments, low frequency information audio signal 114 is a low frequency effects (LFE) channel of multichannel audio signal 102. In other embodiments, low frequency information audio signal 114 is a composite signal of a low frequency effects (LFE) channel of multichannel audio signal 102 and low frequency information signals derived from the left, right, center, left surround, and right surround channels of multichannel audio signal 102. One non-limiting example technique for deriving the composite signal is described in greater detail below.

Low frequency information audio signal 114 produced by low frequency information analyzer 104 is input to haptic track converter 106. In some embodiments, converter 106 applies a low-complexity (e.g., no heuristic search) high-resolution linear predictive coding (LPC)-based signal analysis to low frequency information audio signal 114 to produce uncompressed haptic signal 116. One non-limiting example signal analysis technique for producing uncompressed haptic signal 116 from low frequency information audio signal 114 is described in greater detail below in section 8.2 below entitled "A SECOND HAPTIC TRACK SYNTHESIS EMBODIMENT". Another example signal analysis technique for producing uncompressed haptic signal 116 from low frequency information audio signal 114 is described in greater detail below in Section 8.1 entitled "A FIRST HAPTIC TRACK SYNTHESIS EMBODIMENT".

In some embodiments, uncompressed haptic signal 116 produced by converter 106 is in Immersion™ VibeTonz™ (IVT) format. The IVT format is a haptic signal format containing structured description of haptic effects, similar in ways to the Musical Instrument Digital Interface (MIDI) format for storing musical performances. In other embodiments, haptic signal 116 produced by converter 106 is in 8-8 (8-bit Pulse Code Modulation (PCM)) format. The 8-8 format can store a high-fidelity PCM haptic signal sampled at 8 kHz and 8 bits of resolution, which can be significantly less than audio channel signals. For example, a standard audio channel signal is often sampled at 48 kHz and 16 bits.

Uncompressed haptic signal 116 produced by haptic track converter 106 is input to haptic track encoder 108. Haptic track encoder 108 encodes haptic signal 116 in a lossy format to produce a lower bit-rate form of haptic signal 116, designated as compressed haptic signal 118 in FIG. 1. In some embodiments, compressed haptic signal 118 is a monaural haptic track channel. In some embodiments, haptic signal 116 is compressed to a target bit rate of 32, 48, 64, 96, or 127 kilobits per second (kbps). In some embodiments, compression of haptic signal 116 to a target bit rate of 8 kpbs or even 4 kbps is achievable by recognizing that haptic signal 116 can have different bandwidth and duty cycle properties from audio channel signals which can be exploited to compress haptic signal 116.

Audio encoder 110 conventionally encodes multichannel audio signal 102 to produce a multichannel audio codec bit stream. In addition, audio encoder 110 embeds compressed haptic track 118 as a substream of the multichannel audio codec bit stream to produce multichannel audio codec bit stream 112 containing the encoded audio from multichannel audio signal 102 and compressed haptic track 118. Thus, multichannel audio codec bit stream 112 can be used to transport audio along with haptic content.

4. A First Decoding Embodiment

Figure 2:
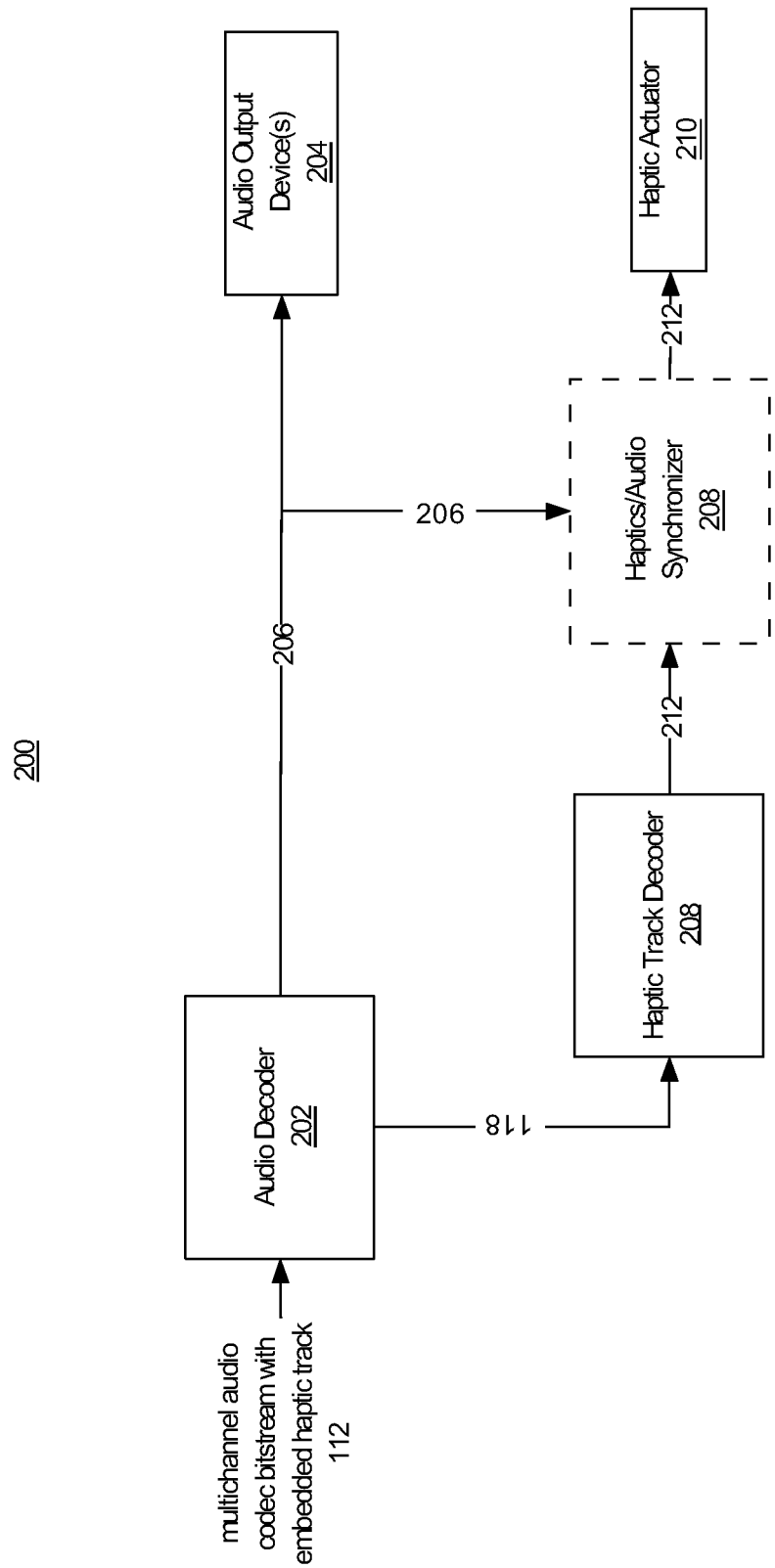
FIG. 2 illustrates a technique for decoding a multichannel audio codec bit stream produced in accordance with the first embodiment of FIG. 1.

Turning now to FIG. 2, it illustrates a technique 200 for decoding multichannel audio codec bit stream 112 produced in accordance the embodiment described above with respect to FIG. 1. Multichannel audio codec bit stream 112 is decoded and resulting audio signal 206 is output by audio output device(s) (e.g., speaker(s), headphone(s), etc.). In addition, the compressed haptic track 118 embedded in multichannel audio codec bit stream 112 is decoded and the resulting haptic signal 212 is sent to haptic actuator 210 to cause haptic effects synchronized to the audio output by the audio output device(s).

In some embodiments, technique 200 is performed by a computing device used by consumer of A/V content such as, for example, a consumer of a movie, television program, a computer game, music, etc. For example, the computing device may be the user's personal computing device such as a mobile phone or a tablet computer with an embedded haptic actuator.

Technique 200 involves various components including audio decoder 202, haptic track decoder 208, haptic actuator 210, and one or more audio output devices 204. Optionally, the various components also include haptics/audio synchronizer 208. The components may be implemented to perform the functions described herein in software, hardware, or a combination of hardware and software, according to the requirements of the particular implementation at hand. All of the components may be embodied in a single computing device such as, for example, a mobile phone, a tablet computing device, or other computing device.

As shown, audio decoder 202 receives multichannel audio codec bit stream 112 with embedded haptic track 118, which can be embedded as a sub-stream of the codec bit stream 112. From multichannel audio codec bit stream 112, audio decoder 202 produces multichannel audio signal 206 which is routed to one or more audio output device(s) 204 and, optionally, haptics/audio synchronizer 208. In addition, audio decoder 202 separates compressed haptic track 118 from input multichannel audio codec bit stream 112. The compressed haptic track 118 is routed to haptic track decoder 208. Haptic track decoder 208 decodes compressed haptic track 118 to produce therefrom haptic signal 212. Haptic signal 212 is received by haptic actuator 210 thereby triggering haptic effects synchronized to the audio output by audio output device(s) 204. Optionally, haptics/audio synchronizer 208 may use multichannel audio signal 206 produced by audio decoder 202 and haptic signal 212 produced by haptic track decoder 206 to synchronize haptic effects output by haptic actuator 210 to audio output by audio output device(s) 204.

5. A Second Haptic Track Synthesis Embodiment

Figure 3:
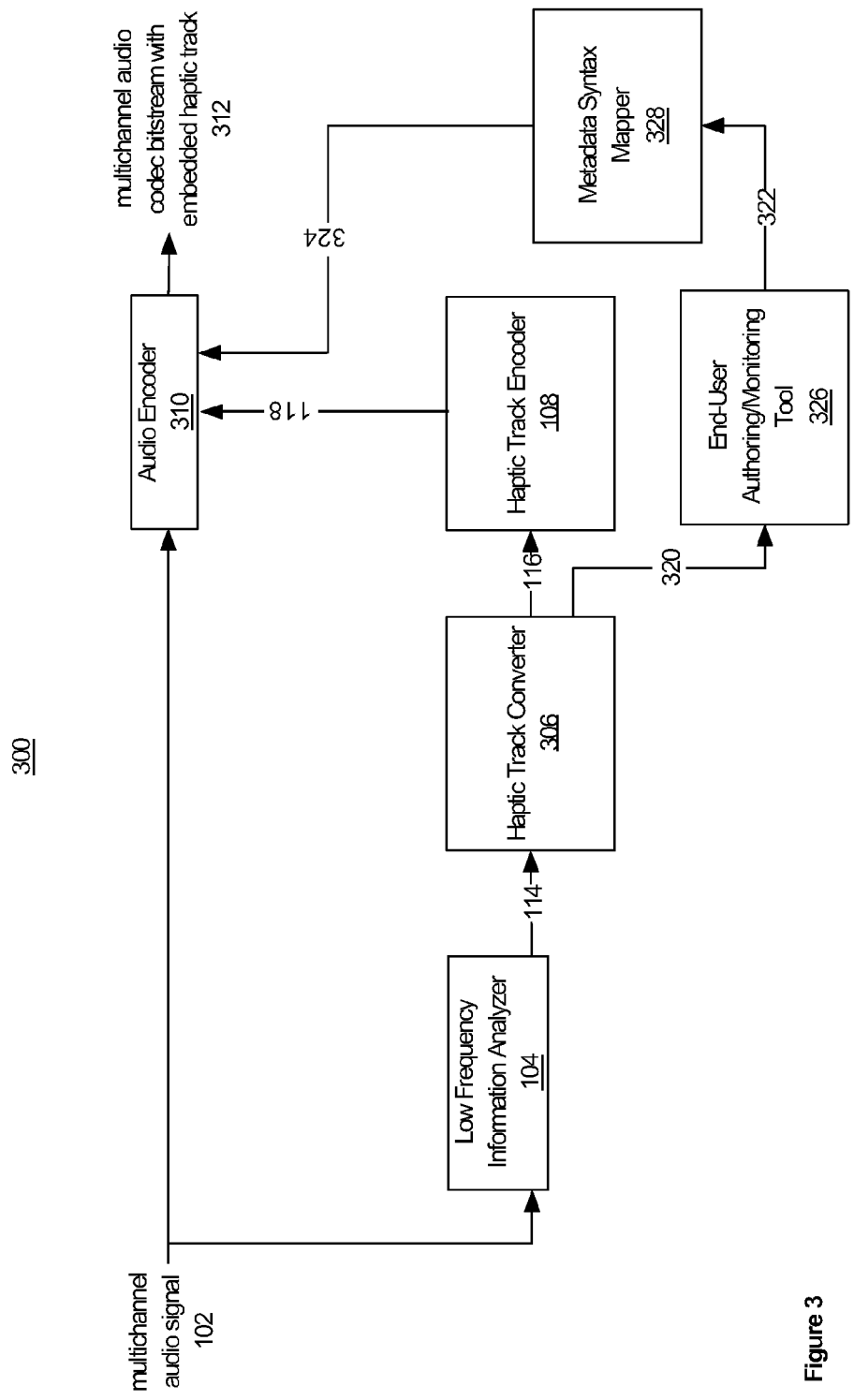
FIG. 3 illustrates a second embodiment of a technique for synthesizing a haptic track from a multichannel audio signal and embedding the synthesized haptic track in a multichannel audio codec bit stream.

Turning now to FIG. 3, it illustrates a technique 300 for synthesizing haptic track 116 from multichannel audio signal 102 according to an embodiment of the present technology. Like technique 100 of FIG. 1, compressed haptic track 118 is produced from haptic track 116 and compressed haptic track 118 is embedded in a multichannel audio codec bit stream 312. However, in addition, select haptic effect parameters 320 are extracted from low frequency information audio signal 114 and provided to end-user authoring/monitoring tool 302. The end-user authoring/monitoring tool 302 can be digital audio workstation software or digital audio mixing software, for example. Adjustments 322 to haptic effect parameters 320 made by a user of authoring/monitoring tool 302 are mapped to parameter adjustment metadata 324 representing parameter adjustments 322. Parameter adjustment metadata 324 can be in a form suitable for embedding in multichannel audio codec bit stream 312. Parameter adjustment metadata 324 is embedded in multichannel audio codec bit stream 312 along with compressed haptic track 118. Multichannel audio codec bit stream 312 can be used to transport the multichannel audio, the haptic track, and the parameter adjustment metadata. In some embodiments, technique 300 is performed by a computing device or computing devices used by an A/V content creator such as, for example, an A/V content creator for a movie studio, music studio, or other professional A/V content creator. In some embodiments, technique 300 facilitates semi-manual authoring of a haptic track. Such a semi-manually authored haptic track may provide an improved A/V and haptic experience to consumers of the multichannel audio codec bit stream 312 when compared to a fully automatically generated haptic track. In particular, the consumers may perceive the semi-manually authored haptic track to be less monotonous and more consistent with audible and/or visuals events of the A/V content when compared to a fully automatically generated haptic track.

Technique 300 involves various components including components described above with respect to FIG. 1. In particular, low frequency information analyzer 104 and haptic track encoder 108 can be used in technique 300. However, haptic track converter 106 is replaced with haptic track converter 306 and audio encoder 110 is replaced with audio encoder 310. In addition, the various components involved in technique 300 include end-user authoring/monitoring tool 326 and metadata syntax mapper 328. The various components may be implemented to perform the functions described herein in software, hardware, or a combination of hardware and software, according to the requirements of the particular implementation at hand.

Like haptic track converter 106, haptic track converter 306 produces haptic signal 116 from low frequency information audio signal 114. In addition, haptic track converter 306 applies the signal analysis to deliver haptic effect parameters 320 to end-user authoring/monitoring tool 326 for possible adjustment. In some embodiments, haptic effect parameters 320 include center frequency, gain, decay rate, and other parameters that allow for modulation of the haptic track during decoding-side processing of the codec bit stream 312.

End-user authoring/monitoring tool 326 is a computer application providing a user interface for adjusting haptic effect parameters 320. As haptic effect parameters 320 are adjusted by a user of the tool 326, tool 326 produces parameter adjustment metadata 322 reflecting the adjustments. The parameter adjustment metadata 322 produced by authoring/monitoring 326 is mapped by metadata syntax mapper 328 to a metadata syntax 324 suitable for embedding in multichannel audio codec bit stream 312.

Like audio encoder 110, audio encoder 310 conventionally encodes multichannel audio signal 102 to produce multichannel audio codec bit stream 312. Also like audio encoder 110, audio encoder 310 embeds compressed haptic track 118 as a substream of multichannel audio codec bit stream 312. In addition, audio encoder 310 embeds the parameter adjustment metadata 324 produced by metadata syntax mapper 328 in multichannel codec bit stream 312. Thus, multichannel audio codec bit stream 312 can be used to transport audio along with haptic content and adjustments to the haptic content to be applied on the decoding side.

6. A Second Decoding Embodiment

Turning now to FIG. 4, it illustrates a technique 400 for decoding multichannel audio codec bit stream 312 produced in accordance the embodiment described above with respect to FIG. 3. Multichannel audio codec bit stream 312 is decoded and resulting audio signal 206 is output by audio output device(s) 204 (e.g., speaker(s), headphone(s), etc.). Resulting audio signal 206 is also sent to haptics/audio synchronizer 426. Compressed haptic track 118 embedded in multichannel audio codec bit stream 312 is decoded by haptic track decoder 208 and the resulting haptic signal 212 is sent to haptics/audio synchronizer 426. Parameters in parameter adjustment metadata 324 embedded in multichannel audio codec bit stream 312 are extracted from parameter adjustment metadata 324 by parameter extractor 428. The extracted parameters 432 are converted to haptic signal 436 by haptic signal converter 430. Haptics/audio synchronizer 426 modulates haptic signal 212 with haptic signal 436 to produce haptic signal 434 which is synchronized to audio signal 206 and sent to haptic actuator 210.

In some embodiments, technique 400 is performed by a computing device used by consumer of A/V content such as, for example, a consumer of a movie, television program, a computer game, music, etc. For example, the computing device may be the user's personal computing device such as a mobile phone or a tablet computer with an embedded haptic actuator.

Technique 400 involves various components including audio decoder 402, haptic track decoder 208, parameter extractor 428, haptics/audio synchronizer 426, and haptic signal converter 430. The components may be implemented to perform the functions described herein in software, hardware, or a combination of hardware and software, according to the requirements of the particular implementation at hand. All of the components may be embodied in a single computing device such as, for example, a mobile phone, a tablet computing device, or other computing device.

Figure 4A:
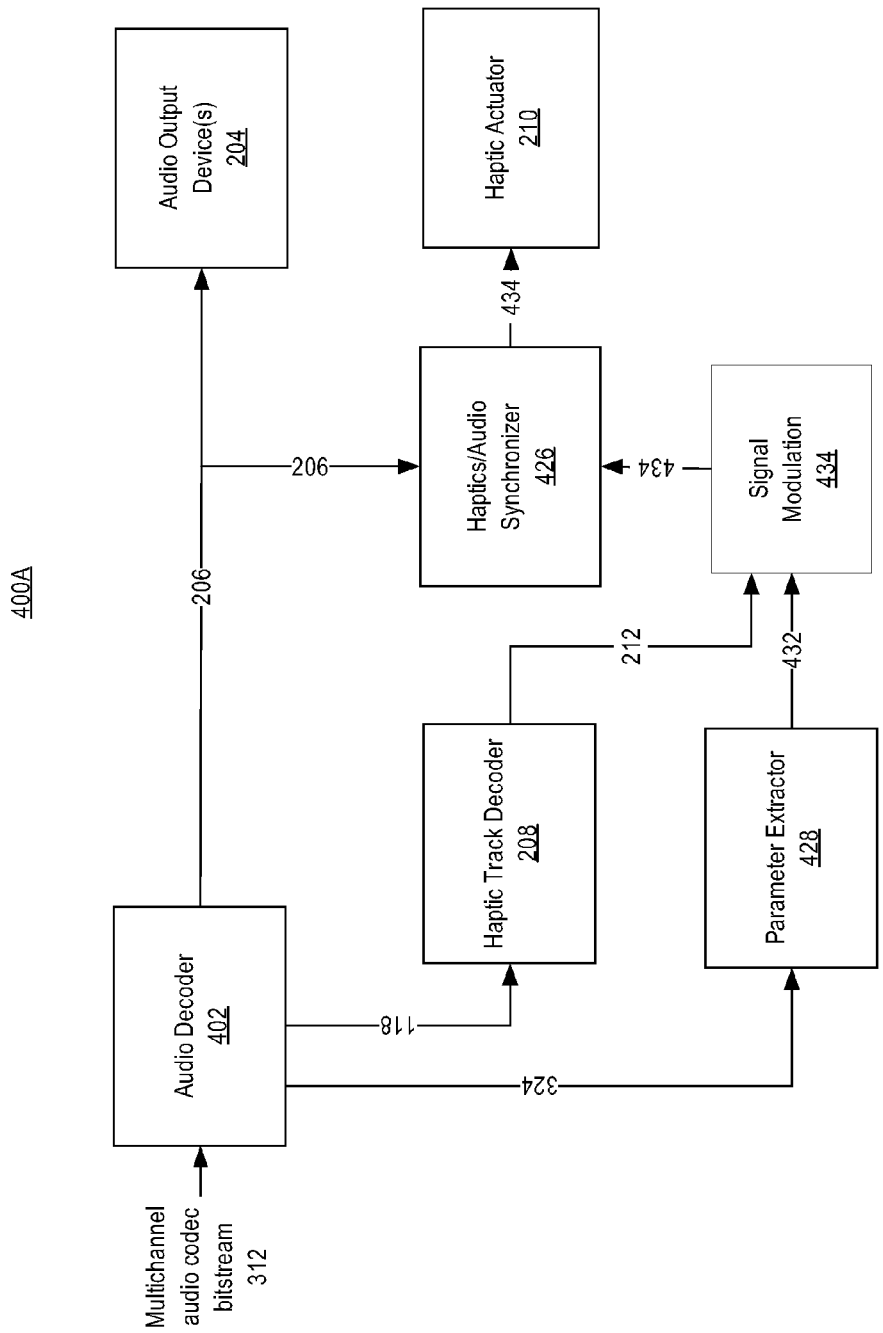
FIG. 4A illustrates another technique for decoding a multichannel audio codec bit stream produced in accordance with the embodiment of FIG. 3.

Turning now to FIG. 4A, it illustrates another technique 400A for decoding multichannel audio codec bit stream 312 produced in accordance with the embodiment described above with respect to FIG. 3. Technique 400A is like technique 400 of FIG. 4. However, technique 400A does not involve haptic signal converter 430. Instead, haptic signal 212 output by haptic track decoder 208 and haptic effect parameters 432 extracted from haptic effect metadata 324 are sent to signal modulation component 434 which modules haptic signal 212 with haptic effect parameters 432 to produce modulated haptic signal 434. Output of modulated haptic signal 434 to haptic actuator 210 is then synchronized with audio signal 206 by haptics/audio synchronizer 426.

7. Composite Low Frequency Information Signal

Turning now to FIG. 5, it illustrates components 500 for generating a composite low frequency information signal from a multichannel audio signal, according to an embodiment of the present technology. For example, the components may be part of low frequency information analyzer 104 of FIG. 1 and FIG. 3. Low Frequency information analyzer 104 may use the components to generate composite low frequency information audio signal 114 from multichannel audio signal 102. The components may be implemented to perform the functions described herein in software, hardware, or a combination of hardware and software, according to the requirements of the particular implementation at hand.

Components 500 produce composite low frequency information signal 514 from low frequency information in multichannel audio signal 502. In this example, audio signal 502 is a 5.1 surround sound audio signal. Audio signal 502 contains left channel signal 502A, right channel signal 502B, center channel signal 502C, left surround channel signal 502D, right surround channel signal 502E, and low frequency effects channel 502F. Each of left channel signal 502A, right channel signal 502B, center channel signal 502C, left surround channel signal 502D, and right surround channel signal 502E are passed through a respective low pass filter 504 to isolate low frequency information in the respective channel signal. In particular, left channel signal 502A is passed through low pass filter 504A, right channel signal 502B is passed through low pass filter 504B, center channel signal 502C is passed through low pass filter 504C, left surround channel signal 502D is passed through low pass filter 504D, and right surround channel signal 502E is passed through low pass filter 504E.

In some embodiments, each of low pass filters 504 is a Linkwitz-Riley (LR2) filter. In other embodiments, each of low pass filters 504 is a dual-cascaded $2^{nd}$ order Butterworth filter with a cutoff frequency. In some embodiments, the cutoff frequency is 80 Hz.

The signals output by filters 504 are combined in series with low frequency effects channel signal 502E. The result being a bass-managed output signal designated as composite low frequency information signal 514 in FIG. 5. For example, composite low frequency information signal 514 can be used as low frequency information audio signal 114 in the haptic signal synthesis embodiments of FIG. 1 and FIG. 3. With composite low frequency information signal 514, a haptic signal can be synthesized that is based not just on a low frequency effects channel signal but also based on low frequency information in other surround sound channels. The resulting haptic signal or a compressed version thereof, when embedded in a multichannel audio codec bit stream delivered to a consumer, can be used to provide haptic effects to the consumer that are more consistent with the output audio because the haptic signal takes into account more low frequency information in the multichannel audio signal 502.

8. Haptic Track Synthesis

In accordance with some embodiments of the present technology, a haptic signal is synthesized from a low frequency information audio signal. The low frequency information audio signal can be a low frequency effects (LFE) channel signal of a multichannel audio signal. Alternatively, the low frequency information audio signal can be a composite of a low frequency effects (LFE) channel signal of a multichannel audio signal and other low frequency information from other audio channels of the multichannel audio signal. More generally, the low frequency information audio signal can be a combination of multiple channels from the multichannel audio signal. In this case, the multiple channels can first be down mixed and, optionally, low pass filtered.

8.1 A First Haptic Track Synthesis Embodiment

Figure 6:
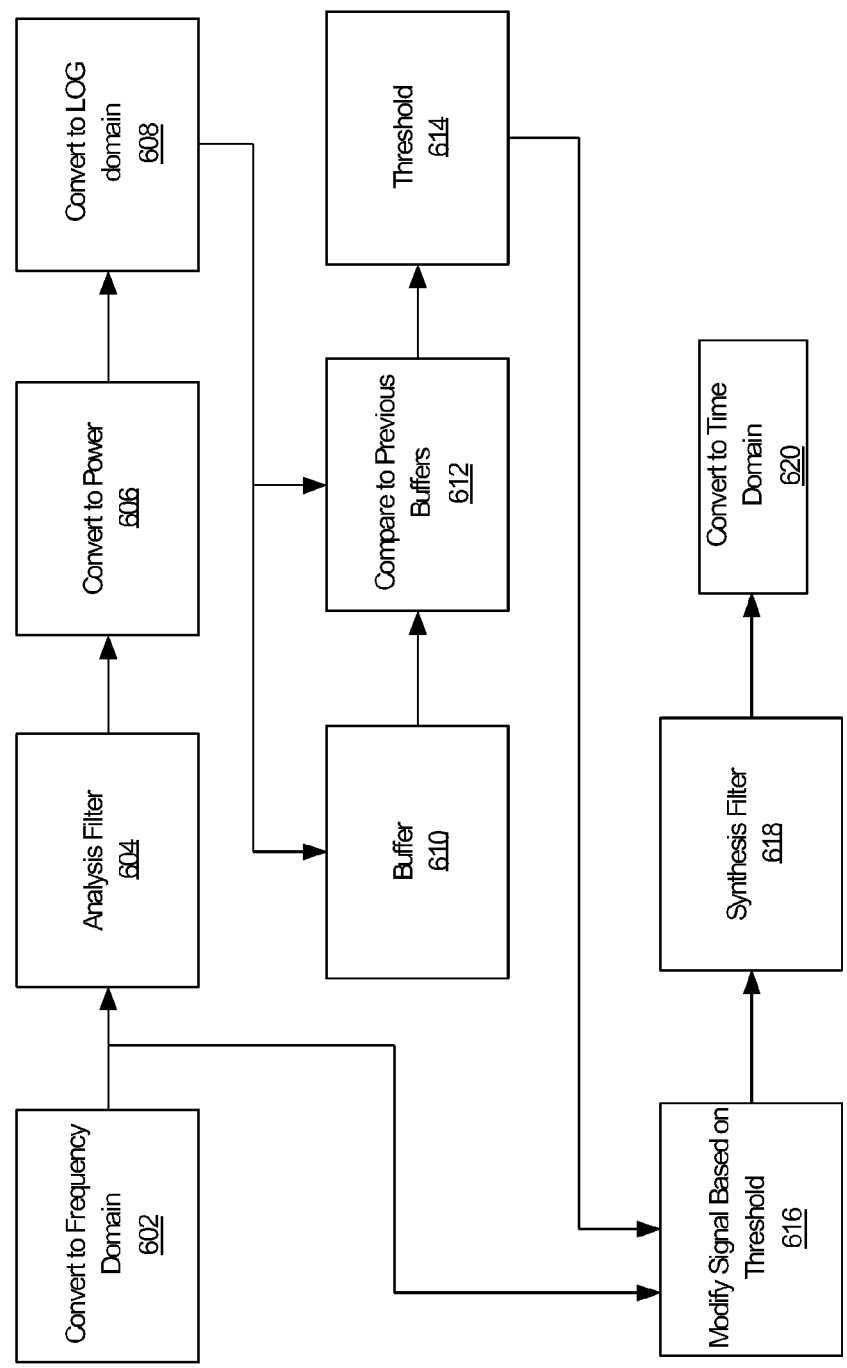
FIG. 6 is a flowchart of a technique for synthesizing a haptic signal from a low frequency information audio signal, according to an embodiment of the present technology.

Turning now to FIG. 6, it is a flowchart of a technique 600 for synthesizing a haptic signal from a low frequency information audio signal, according to an embodiment of the present technology. The synthesized haptic signal produced by technique 600 can be used as haptic signal 116 in the embodiments of FIG. 1 and FIG. 3, for example.

At block 602, the low frequency information audio signal is converted to the frequency domain by a forward frequency transform. For example, the forward frequency transform can be a Discrete Fourier Transform (DFT) or a Quadrature Mirror Filterbanks (QMF)-based forward frequency transform, or other transform. Some embodiments might strictly exist in the time domain.

The forward frequency transform produces a series of blocks of audio data in the frequency domain. At block 604, an analysis filter is applied to a first audio data block to band-limit the audio data. For example, a low passed filter can be applied to the first audio data block to band-limit the audio data.

At block 606, one or more audio data blocks of the low frequency information audio signal in the frequency domain are converted to power and at block 608 the log of the power is taken in decibel scale. At block 610, the one or more audio data blocks are buffered for later comparison.

At block 612, once n (e.g., 3) number of audio data block buffers have been accumulated, the power computed for a current buffer x is compared to the power computed for a previous buffer y (e.g., y=x−2). If, at block 614, the comparison of power exceeds a threshold, then, at block 616, the low frequency information audio signal is modified by multiplying the low frequency information audio signal by a gain or by a non-linearity. If, on the other hand, at block 614, the comparison of power does not exceed a threshold, then, at block 616, the low frequency information audio signal is modified to make the signal quiet by applying a small gain less than 1 (e.g., 0.01).

At block 618, a synthesis filter is applied to the modified low frequency information signal so that the signal is still band-limited.

At block 620, the signal output by the synthesis filter is transformed to the time domain through an inverse frequency transform. The resulting signal is the haptic signal.

Figure 7:
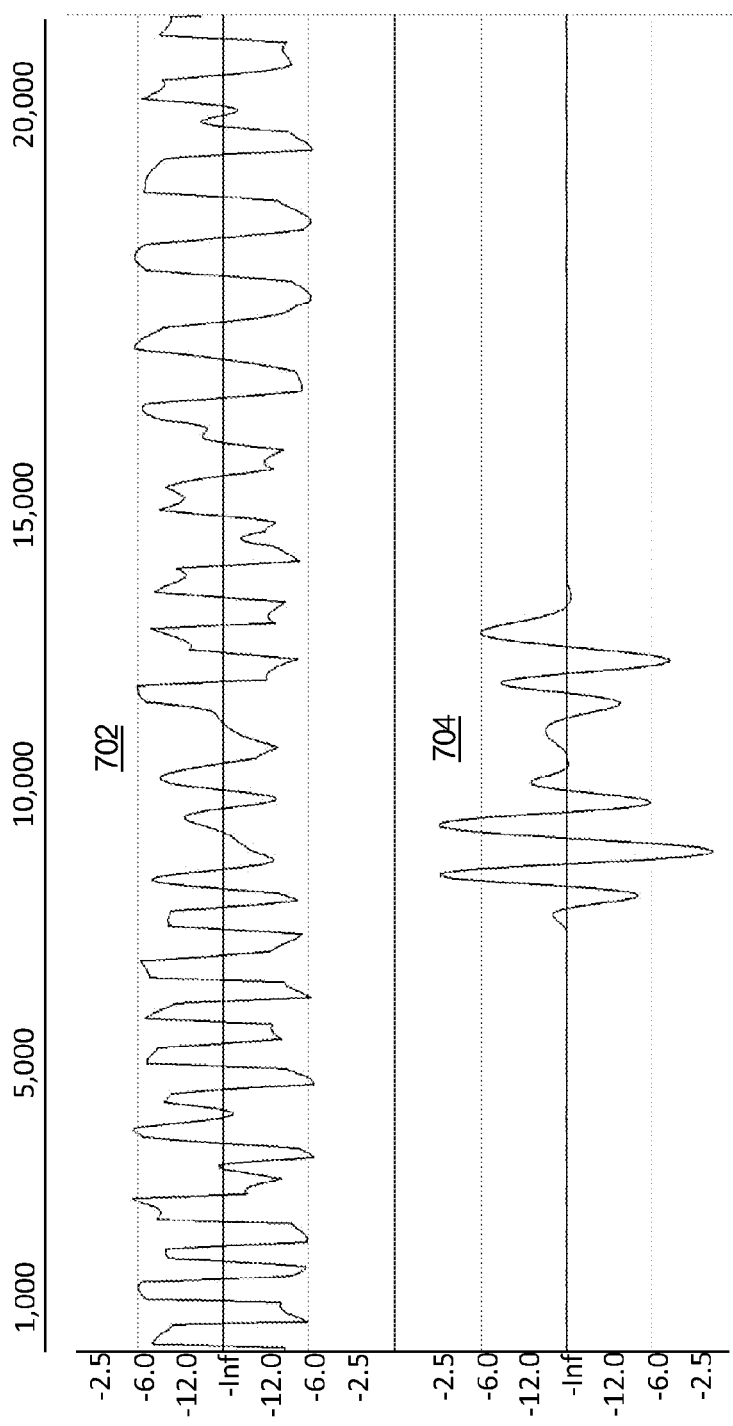
FIG. 7 shows a plot of a sample haptic signal output by the technique of FIG. 6 based on a sample low frequency information audio signal input to the technique of FIG. 6.

FIG. 7 shows a plot 704 of a sample haptic signal output by technique 600 of FIG. 6 based on a sample low frequency information audio signal input to technique 600.

8.2 A Second Haptic Track Synthesis Embodiment

In one example embodiment, the haptic signal is derived from the low frequency information audio signal based on a low-complexity (e.g., no heuristic search) high-resolution linear predictive coding (LPC)-based low frequency information signal analysis. The signal analysis is frame based. Frames can be 1024 samples in length. Also, frames may overlap. For example, frames may overlap 50%. The example signal analysis includes the following steps:

(Step A)—Initially, the low frequency information audio signal is decimated by filtering the low frequency information audio signal with a low pass filter and then resampling the resulting smoothed signal at a lower rate. In one example embodiment, the signal is decimated from a sampling rate of 48 kHz down to 1 kHz.

(Step B)—Next, a Forward Frequency Transform (FFT) is applied to the smoothed signal at the lower rate to transform it from the time domain to the frequency domain as in: $X'(z) \leftarrow \rightarrow x'(n)$. In this, pth-order linear predictive coding (LPC) coefficients $a_k$ for high-resolution low-frequency spectral matching with smoothing are computed as in: $\hat{X}'(z) = 1/(1+\Sigma_{k=1}^{P} a_k z^{-k})$. In one embodiment, p is 16.

(Step C)—Next, the center frequency $\omega_k$ is extracted from of pole-angles of the LPC coefficients $a_k$ as in: $\Pi_{k=1}^{P} 1(1+z_k z^{-1})$; $z_k = a_k \exp(j\omega_k)$.

(Step D)—Next, the gain $G_k$ at center frequencies from Step B are determined as in: $G_k = 20 \log_{10} |X(\omega_k)|$.

(Step E)—Next, −3 dB frequency points $(\omega_{+k}, \omega_{-k})$ from Step B and Step D are determined. In some embodiments, this is accomplished by setting limits for the search of the frequency region around $\omega_k$ and equating a for loop between the bin value corresponding to the lower frequency limit and $\omega_k$, and $\omega_k$ and bin value corresponding to the higher frequency unit.

(Step F)—Next, a quality factor $Q_k$ is determined as in: $Q_k = \omega_k/(\omega_{+k} - \omega_{-k})$.

(Step G)—Next, impulse response is synthesized using parametric filter bank as in:

$$H_k(z) = (b_0 + b_1 z^{-1} + b_2 z^{-2})/(a_0 + a_1 z^{-1} + a_2 z^{-2});$$

$$\omega_k = 2\pi f_k / f_s;$$

$$g_k = 10^{G_k/20};$$

$$\beta = 2\left(\frac{\omega_k}{Q_k}\right) + (\omega_k)^2 + 4;$$

$$b_0 = \left(2g_k\left(\frac{\omega_k}{Q}\right) + (\omega_k)^2 + 4\right)\bigg/\beta;$$

$$b_1 = (2\omega_k^2 - 8)/\beta;$$

$$b_2 = \left(4 - \frac{2g_k\omega_k}{Q_k} + \omega_k^2\right)\bigg/\beta;$$

$$a_0 = 1;$$

$$a_1 = (2\omega_k^2 - 8)/\beta;$$

$$a_2 = \left(4 - \frac{2g_k\omega_k}{Q} + \omega^2\right)\bigg/\beta;$$

(Step H)—Next, compute sum of sinusoids:

$$x(n) = \Sigma_{k=1}^{N} a_k \sin(\omega_k n);$$

$$y(n) = \Sigma_{k=1}^{N} G_k x(n);$$

(Step I)—Next, deliver y(n) from Step H as the haptic signal. For example, y(n) may be haptic signal 116 of FIG. 1 and FIG. 3. Also, deliver haptic effect parameters $(\omega_c, Q_k, G_k)$ to authoring/monitoring tool or other tool for adjustment. For example, haptic effect parameters $(\omega_k, Q_k, G_k)$ can be parameters 320 of FIG. 3.

Figure 8A:
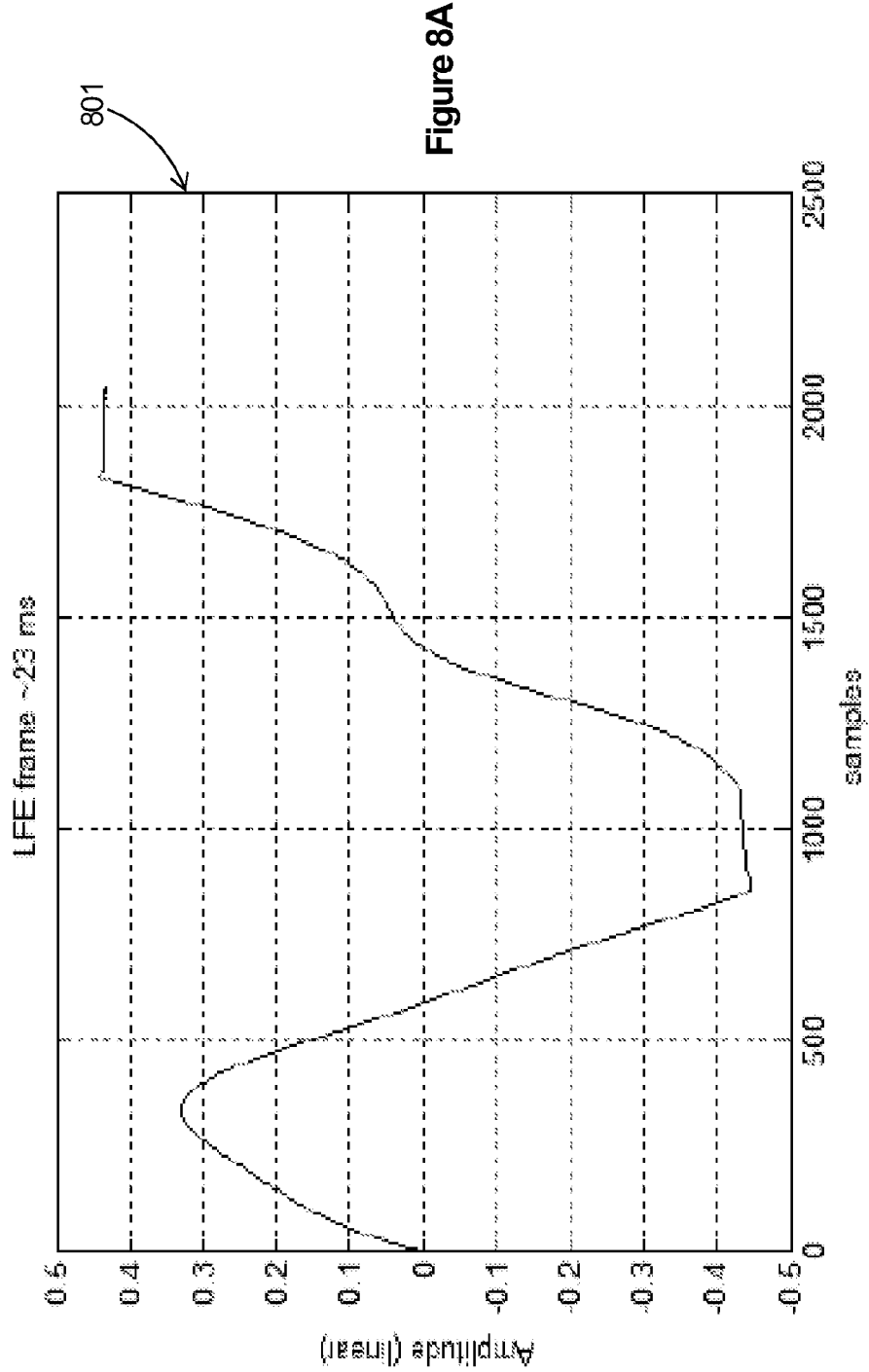

An example of extracting a haptic effect parameters from an LFE channel signal is shown in FIG. 8A and FIG. 8B. In FIG. 8A, a waveform 801 of a frame of the LFE channel signal is shown. The frame contains approximately 2048 audio samples which corresponds to approximately twenty three (23) milliseconds of the LFE channel signal.

FIG. 8B plots the LFE signal portion represented by waveform 801 after the portion has been decimated by a factor of forty eight (48). In some embodiments, decimation is performed to achieve a high-quality LPC model fit in the low frequencies. The decimation brings the sampling frequency down from 48 kHz to 1 kHz thereby providing high quality resolution up to 500 Hz. Plot 802 shows the decimated frame signal and corresponding magnitude response in decibels. The decimated signal is used by the LPC model described above as in Step B through Step F to extract the center frequency $\omega_k$ and the gain $G_k$. The LPC model is plotted at 804 in FIG. 8B.

While in some embodiments, an LPC model is used to extract haptic effect parameters from a decimated low frequency information signal, a LPC model is not used in other embodiments. For example, a heuristic search may be used instead of an LPC model. However, a heuristic search can be significantly more computationally intensive than a LPC model-based extraction. In addition, a heuristic search can be more inaccurate for estimating the center frequency $\omega_k$ and the gain $G_k$ when compared to a LPC model.

9. Additional Haptic Effect Parameters

In accordance with some embodiments, additional haptic effect parameters are extracted during haptic track synthesis. For example, a modulation haptic effect parameter based on spectrogram analysis for controlling the temporal characteristics of haptic effects can be extracted from the low frequency information signal (e.g., low frequency information signal 114 of FIG. 1 and FIG. 3 or low frequency information signal 514 of FIG. 5) as follows:

(Step i)—Initially, a time-frequency-intensity-map for the low frequency information signal in the time domain is computed as: $15|STFT(t,\omega_k)|^2$;

(Step ii)—Next, time-slice spectrogram $S_{\omega k}(t)$ of center frequency $\omega_k$ is computed as: $|STFT(t, \omega_k)|^2$ (Step iii)—Optionally, smoothing may be performed, for example, by k-th order polynomial approximation.

(Step iv)—Next, synthesize:

$$x(n)=\Sigma_{k=1}^{N} a_k \sin(\omega_k n);$$

$$y(n)=\Sigma_{k=1}^{N} 10^{S_{\omega k}(t)/10} x(n);$$

Figure 9:
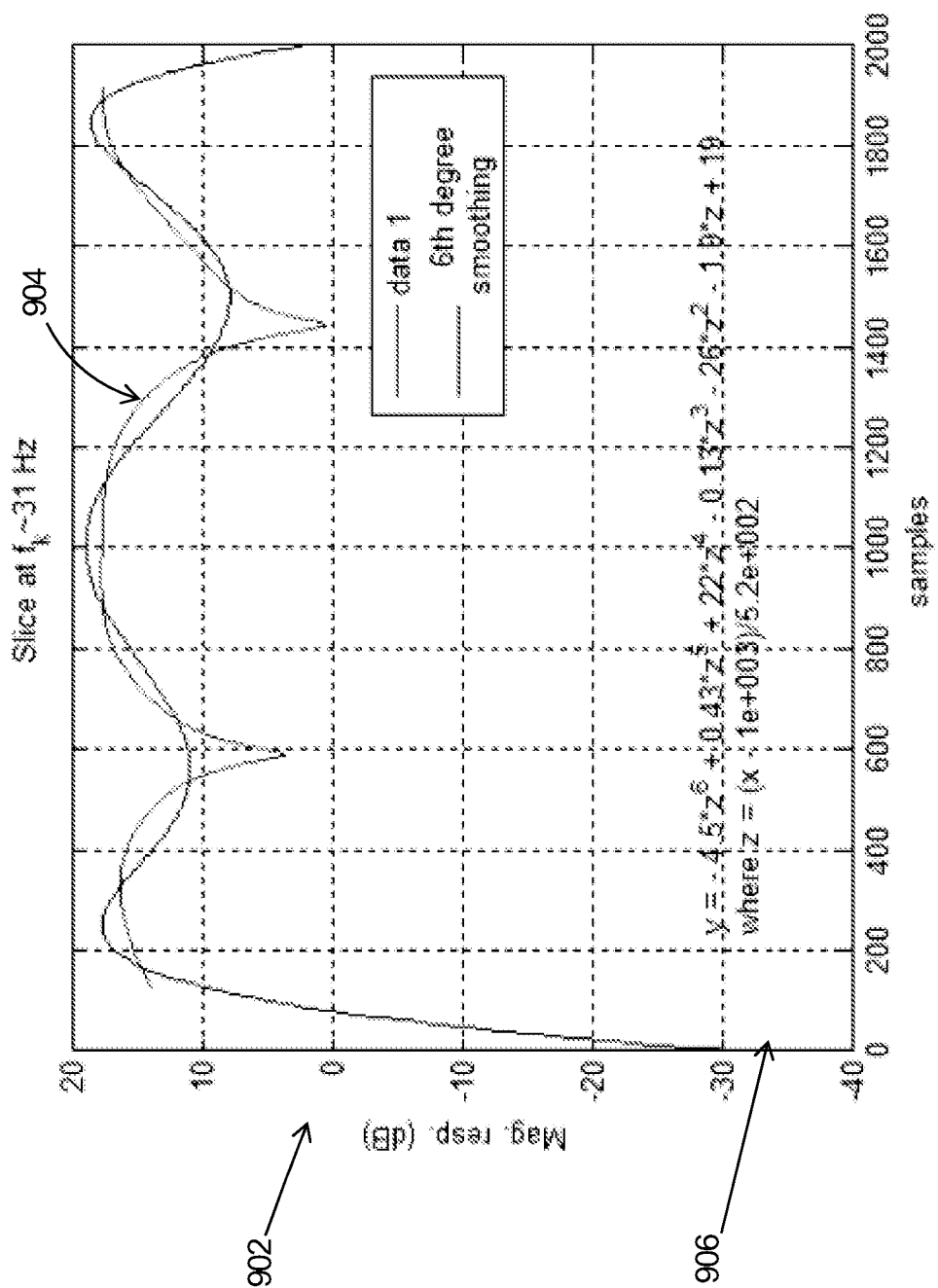
FIG. 9 provides an example plot of a spectrogram analysis for extracting a modulation haptic effect parameter, in accordance with an embodiment of the present technology.

Turning now to FIG. 9, it illustrates an extracted time-slice spectrogram $S_{\omega k}(t)$ of center frequency $\omega_k$. In this example, the center frequency $\omega_k$ is approximately 31 Hz and the temporal characteristics are extracted at approximately 31 Hz. This analysis indicates whether there is signal decay or modulation. Plot 904 is the time-slice of the spectrogram at approximately 31 Hz. In this example, the signal is smoothed using a polynomial approximation 906. The polynomial approximation is shown by plot 902. While in some embodiments, a polynomial approximation is used for signal smoothing, a polynomial approximation is not used for signal smoothing in other embodiments. However smoothed, the smoothed signal is used to extract modulation haptic effect parameters. In some embodiments, the modulation haptic effect parameters are the coefficients of the polynomial approximation equation used for signal smoothing and the order of the polynomial approximation. For example, in this example, the coefficients are those in equation 906, which is a 6-th order polynomial approximation equation.

10. Manually Authored Haptic Effects

Figure 10:
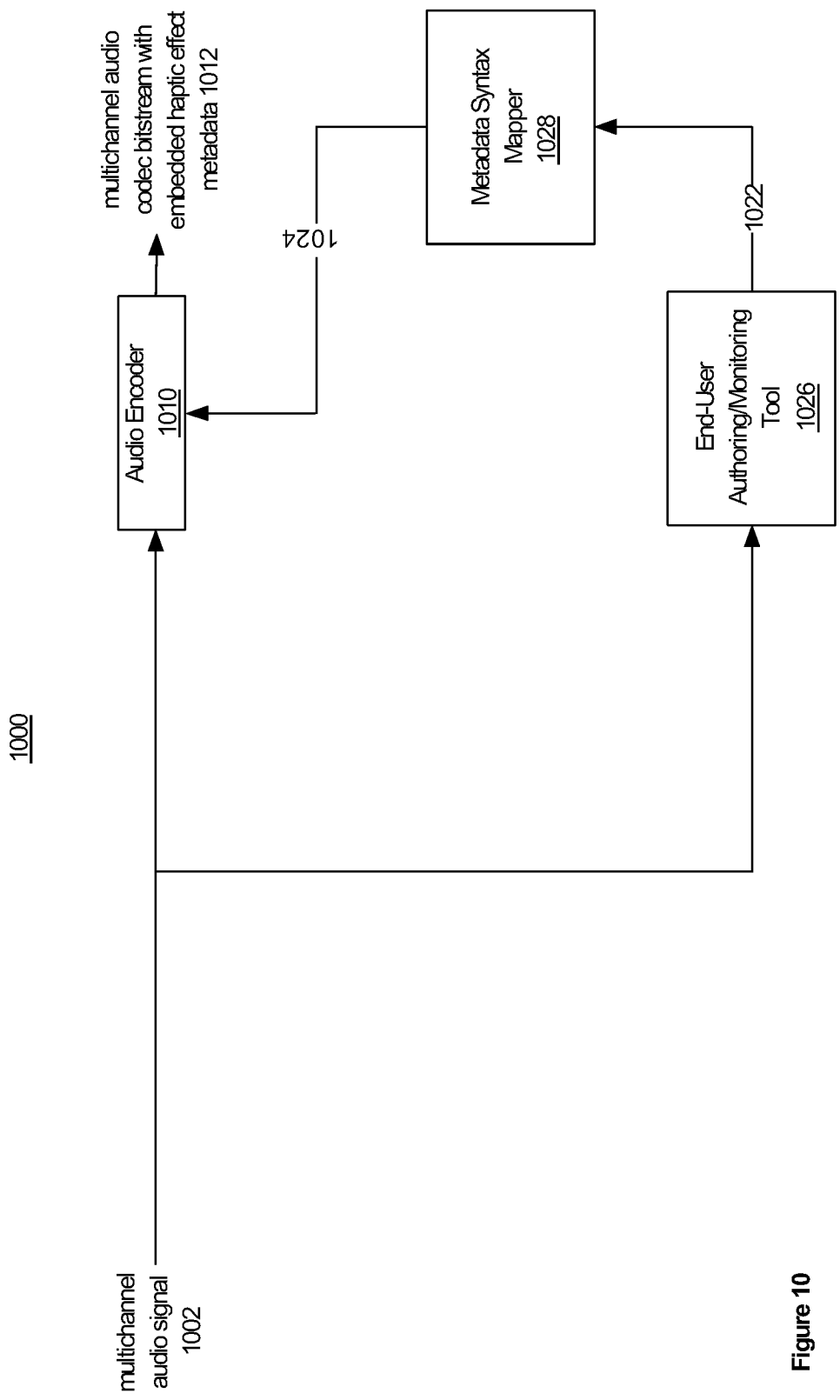
FIG. 10 is a block diagram illustrating a technique for manually authoring haptic effects, according to an embodiment of the present technology.

In some embodiments, instead of synthesizing a haptic track from a multichannel audio signal and embedding the haptic track in a codec bit stream, metadata reflecting a manually authored haptic effects is embedded in the codec bit stream. This is illustrated in FIG. 10, which is a block diagram of a technique 1000 for manually authoring haptic effects. During the encoding process, a user of an end-user authoring/monitoring tool 1026 provides input to tool 1026 reflecting timing, magnitude, and characteristics of haptic effects to accompany the audio carried by multichannel audio signal 102. The tool 1026 provides metadata 1022 reflecting the user's input to metadata syntax mapper 1028 which maps metadata 1022 to a syntax 1024 suitable for embedding in multichannel audio codec bitstream 1012. Audio encoder 1010 encodes multichannel audio signal 1002 and embeds metadata syntax 1024 in multichannel audio codec bit stream 1024. Thus, multichannel audio codec bit stream 1012 carries the encoding audio signal 1002 and haptic effect metadata 1024 reflecting the user's input to tool 1026 during the monitoring/encoding process.

Figure 11:
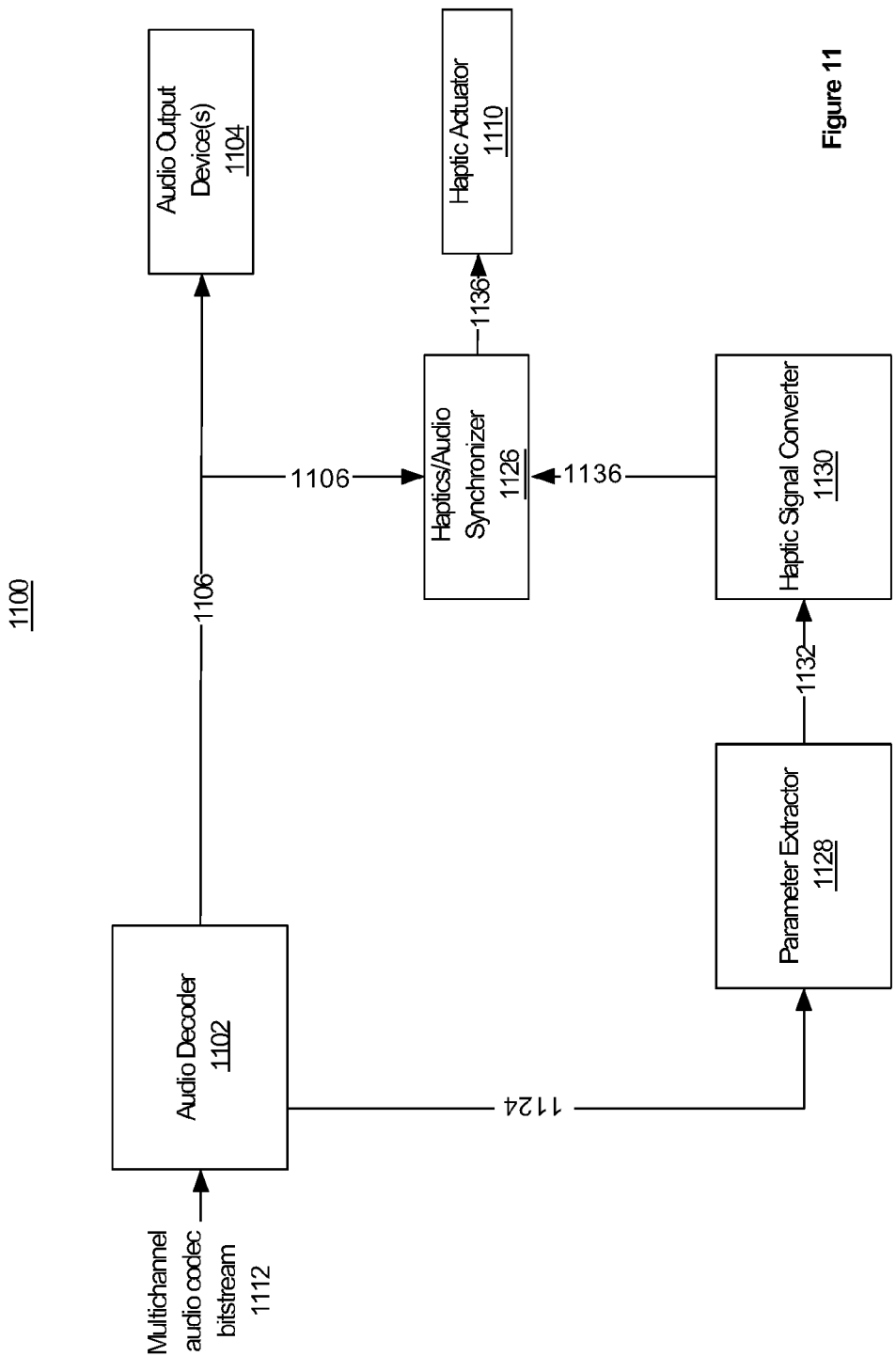
FIG. 11 is a block diagram illustrating a technique for decoding a multichannel audio codec bit stream carrying metadata reflecting manually authored haptic effects, according to an embodiment of the present technology.

Turning now to FIG. 11, it is a block diagram illustrating a technique 1100 for decoding a multichannel audio codec bit stream 112 carrying metadata reflecting manually authored haptic effects, according to an embodiment of the present technology. Audio decoder 1102 decodes multichannel audio signal 1106 from multichannel audio codec bit stream 1112. Also, audio decoder 1102 sends manually authored haptic effect metadata 1124 embedded in multichannel audio codec bit stream 1112 to parameter extractor 1128. Parameter extractor 1128 extracts various parameters of the manually authored haptic effects from manually authored haptic effect metadata 1124. The extracted parameter metadata 1132 is sent to haptic signal converter 1130 which converts extracted parameter metadata 1132 to haptic signal 1136. Haptics/audio synchronizer 1126 synchronizes delivery of haptic signal 1136 to haptic actuator 1110 with multichannel audio signal 1106 delivered to audio output device(s) 1104.

10. Carriage of Haptic Effect Metadata in Audio Codec Bit Stream

In some embodiments of the present technology, metadata representing haptic effect parameters or adjustments thereto are formatted for carriage in a multichannel audio codec bit stream. For example, the formatting may be performed by metadata syntax mapper 328 of FIG. 3 or metadata syntax mapper 1028 of FIG. 10. For purpose of providing clear examples, metadata representing haptic effect parameters and metadata representing adjustments to haptic effect parameters is referred to hereinafter as "haptic effect metadata" and haptic effect metadata formatted for carriage in a multichannel audio codec bit stream is referred to hereinafter as "formatted haptic effect metadata".

In some embodiments, haptic effect metadata is formatted for carriage within an AC-3 or an E-AC-3 multichannel audio codec bit stream. AC-3 and E-AC-3 are defined in the Advanced Television Systems Committee (ATSC) standard A/52b and the European Telecommunications Standards Institute (ETSI) Technical Standard (TS) 102 366.

In some embodiments, the formatted haptic metadata is inserted into one of, or any of the following bit fields (syntactical elements) of AC-3 or E-AC-3 bit streams:

1. Auxiliary data field (aux bits).
2. Addbsi data field.
3. In one of, or any available skip or wastebit field.

In some embodiments, the haptic effect metadata is formatted for carriage within a secure and extensible metadata container prior to inserting the formatted haptic effect metadata into any one of, or all of, the available bit fields listed above. Example of a suitable secure and extensible metadata containers for carrying formatted haptic effect metadata are described in the following related applications, the entire contents of each of which is hereby incorporated by reference as if fully set forth herein: U.S. Pat. Appln. No. 61/824,010, entitled "AUDIO ENCODER AND DECODER WITH PROGRAM BOUNDARY METADATA AND PROCESSING STATE METADATA", filed May 16, 2013; U.S. patent application Ser. No. 13/989,256, entitled "ADAPTIVE PROCESSING WITH MULTIPLE MEDIA PROCESSING NODES", filed May 23, 2013; U.S. Pat. Appln. No. 61/836, 865, entitled "AUDIO ENCODER AND DECODER WITH PROGRAM INFORMATION OR SUBSTREAM STRUCTURE METADATA", filed Jun. 19, 2013; and U.S. Pat. Appln. No. 61/889,131, entitled "AUDIO BITSTREAMS WITH SUPPLEMENTARY DATA AND ENCODING AND DECODING OF SUCH BITSTREAMS", filed Oct. 10, 2013.

Formatting haptic effect metadata for carriage within a secure and extensible metadata container such as AC-3 or E-AC-3 provides a number of benefits. For example, the container is extensible to carry other types of data that are related or unrelated to the compressed audio bit stream itself. The container can carry timestamps that precisely align the formatted haptic effect metadata with a specific decoded audio sample. The container can also include protection bits via a digital signature that enable authentication of the formatted haptic effect metadata payloads using a unique key. The container can also provide a mechanism via a specific payload type, such as external_data, that enables the formatted haptic effect metadata to be delivered to an audio decoder dynamically upon request via an out-of-band secondary channel such as via the Internet or other data network and synchronized to the compressed audio frames/samples carried in another primary or forward channel such as, for example, over-the-air, by cable, by telephone lines, or via the Internet. In this case, it is not required that both the primary and secondary forward channels are synchronous.

In some embodiments, the formatted haptic effect metadata is contained within the multichannel audio codec bit stream in a serialized binary format. In other embodiments, the formatted haptic effect metadata is contained within the codec bit stream in a character-based format such as eXtensible Markup Language (XML).

Figure 12:
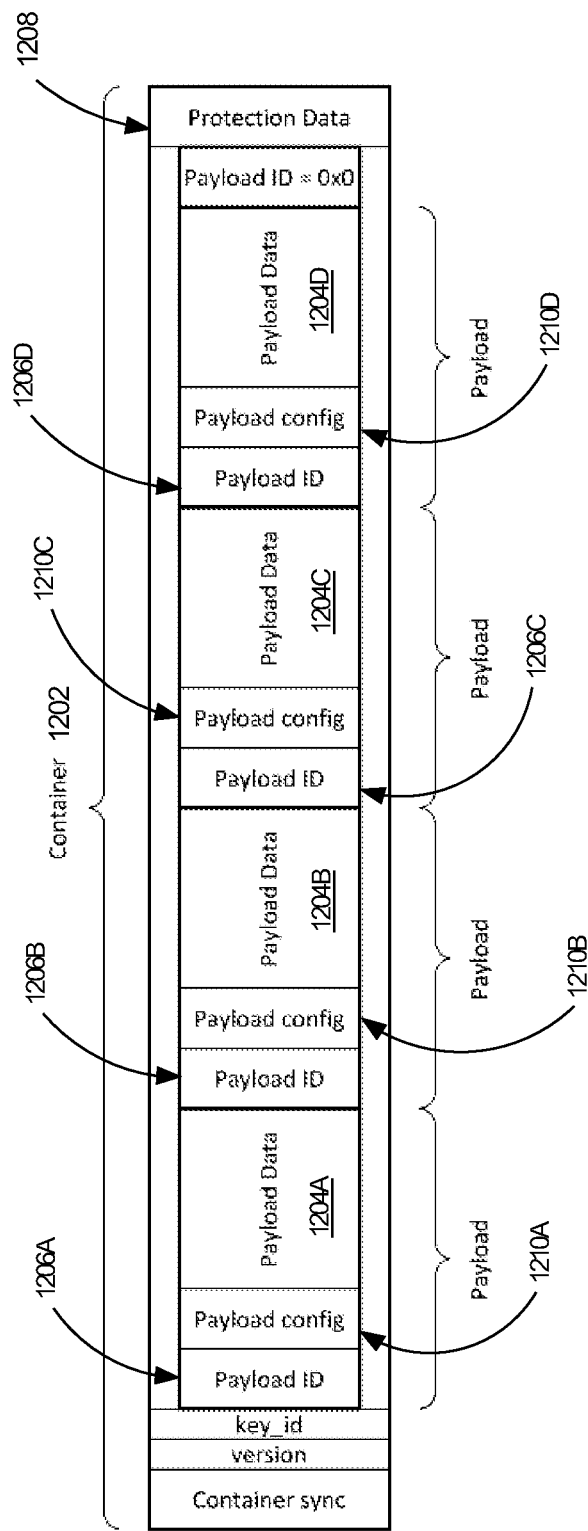
FIG. 12 is a block diagram of a secure and extensible metadata container suitable for carrying formatted haptic effect metadata in a multichannel audio codec bit stream, according to an embodiment of the present technology.

FIG. 12 is a block diagram of a secure and extensible metadata container 1202 suitable for carrying formatted haptic effect metadata in a multichannel audio codec bit stream, according to an embodiment of the present technology. Container 1202 is structured in accordance with ETSI TS 102 366 Annex H. As shown, container 1202 contains one or more data payloads 1204A, 1204B, 1204C, 1204D, etc. (generally, "payload 1204"). Each payload 1204 can be identified in container 1202 using a unique payload identifier value 1206 to provide an unambiguous indication of the type of data present in the payload. In some embodiments, the order of payloads 1204 within container 1202 is undefined. In these embodiments, payloads 1204 can be stored in any order within container 1202, and a processor or parser of container 1202 can process or parse the entire container 1202 to extract relevant payloads 1104, and ignore payloads 1204 that are either not relevant. Formatted haptic effect metadata parameters can be carried in one or more payloads 1204. Protection data 1208 follows the final payload in container 1202. Protection data 1208 can be used by a decoding device or other container 1202 processor to verify that container 1202 and the payloads 1204 within container 1202 are error-free and authentic. For example, the decoding device or other container 1202 processor can use protection data 1208 to verify that the formatted haptic effect metadata is uniquely coupled to the compressed audio essence carried in audio blocks within the current syncframe.

Figure 13:
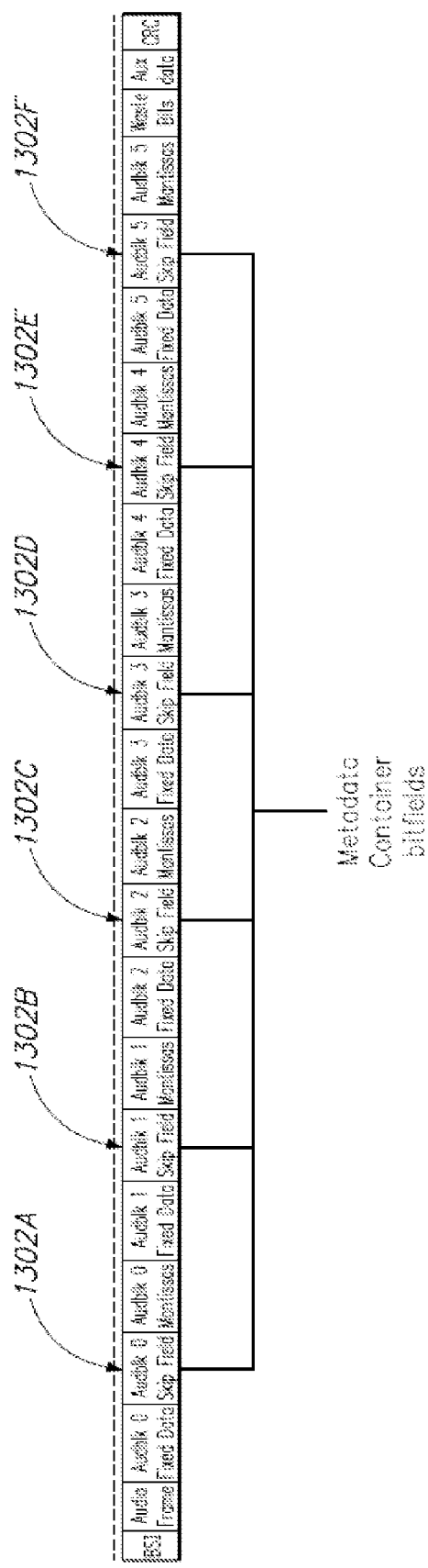
FIG. 13 is a block diagram of an audio codec syncframe with a secure and extensible metadata container distributed in skip fields of the syncframe, according to an embodiment of the present technology.

In some embodiments, container 1202 carrying one or more payloads 1204 that include formatted haptic effect metadata is distributed across the skip field locations with each AC-3 or E-AC-3 syncframe as shown in FIG. 13. In particular, FIG. 13 is a block diagram of an AC-3/E-AC-3 syncframe with container 1202 distributed in skip fields 1302 of the syncframe. For this, a field in the payload configuration data 1210 (FIG. 12) can carry a timestamp parameter that is utilized to time-align formatted haptic effect metadata with a specific audio sample upon decoding in the current or a future syncframe. In some embodiments, the timestamp is generated during the encoding process when formatting haptic effect metadata for embedding in a multichannel audio codec bit stream.

Figure 14A:
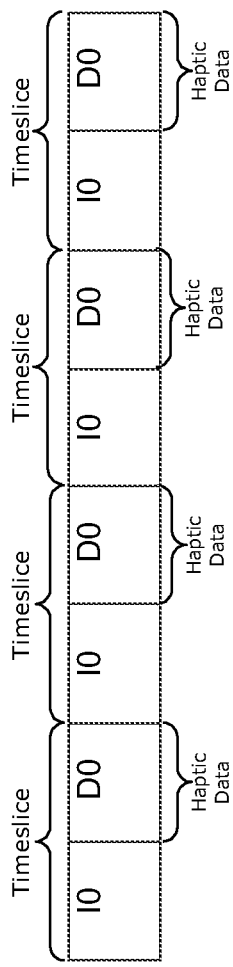
FIG. 14A is a block diagram of haptic effect metadata carried in a dependent substream of a multichannel audio codec bit stream, according to an embodiment of the present technology.
Figure 14B:
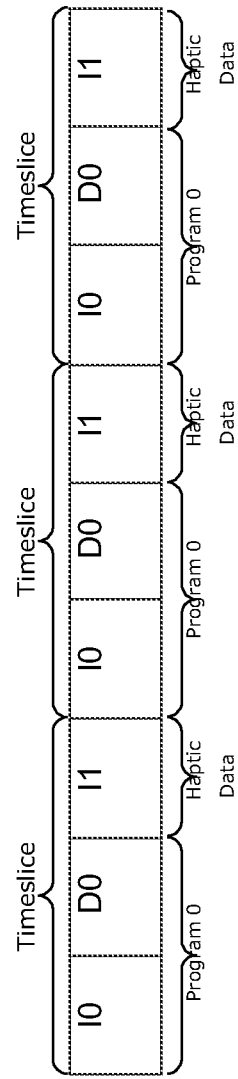
FIG. 14B is a block diagram of haptic effect metadata carried in an independent substream of a multichannel audio codec bit stream, according to an embodiment of the present technology.

In some embodiments, the haptic effect metadata is formatted for carriage in any dependent and/or independent sub-streams as defined in ATSC A52/b Annex E. Examples are found in FIG. 14A and FIG. 14B. In these embodiments, as shown by example in FIG. 14A and FIG. 14B, formatted haptic effect metadata can be constrained to the same time slice as the sub streams that are carrying the compressed audio essence/signals that the haptic effect metadata was derived from during the encoding or production processes upstream from the decoder. FIG. 14A is an example of formatted haptic effect metadata carried in E-AC-3 dependent substream 0. FIG. 14B is an example of formatted haptic effect metadata carried E-AC-S independent substream 1.

In some embodiments, haptic effect metadata is formatted for carried within the MPEG2 and MPEG4 family of multichannel audio codec bit stream. The MPEG2 and MPEG4 audio codec formats are described in ISO/IEC 14496-3 and ISO/IEC 13818-3. In these embodiments, haptic effect metadata can be carried within a multichannel audio codec bit stream that complies with the ISO/IEC 14496-3 specification (also known as MPEG4) or the ISO/IEC 13818-3 specification (also known as MPEG2 AAC Audio). In some embodiments, formatted haptic effect metadata is inserted into one or both of the following bit fields (syntactical elements) as defined in ISO/IEC 14493-3 and ISO/IEC 13818-3:

1. Data_stream (DSE); or
2. Fil (FIL) elements.

In some embodiments, formatted haptic effect metadata is carried as a specific payload in metadata container format 1202 of FIG. 12 prior to being distributed (packed) into the MPEG4 bitstream DSE and FIL elements.

While embodiments described above for carrying formatted haptic effect metadata refer to particular audio codec bit stream format standards, it should be understood and one skilled in the art will appreciated based on the description above that formatted haptic effect metadata can be carried within and/or synchronized with other audio codec bit stream formats that support the definition and/or carriage of unique substreams, presentations and/or auxiliary or universal (meta)data on a frame-by-frame basis.

11. Example Implementing Mechanism

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 15:
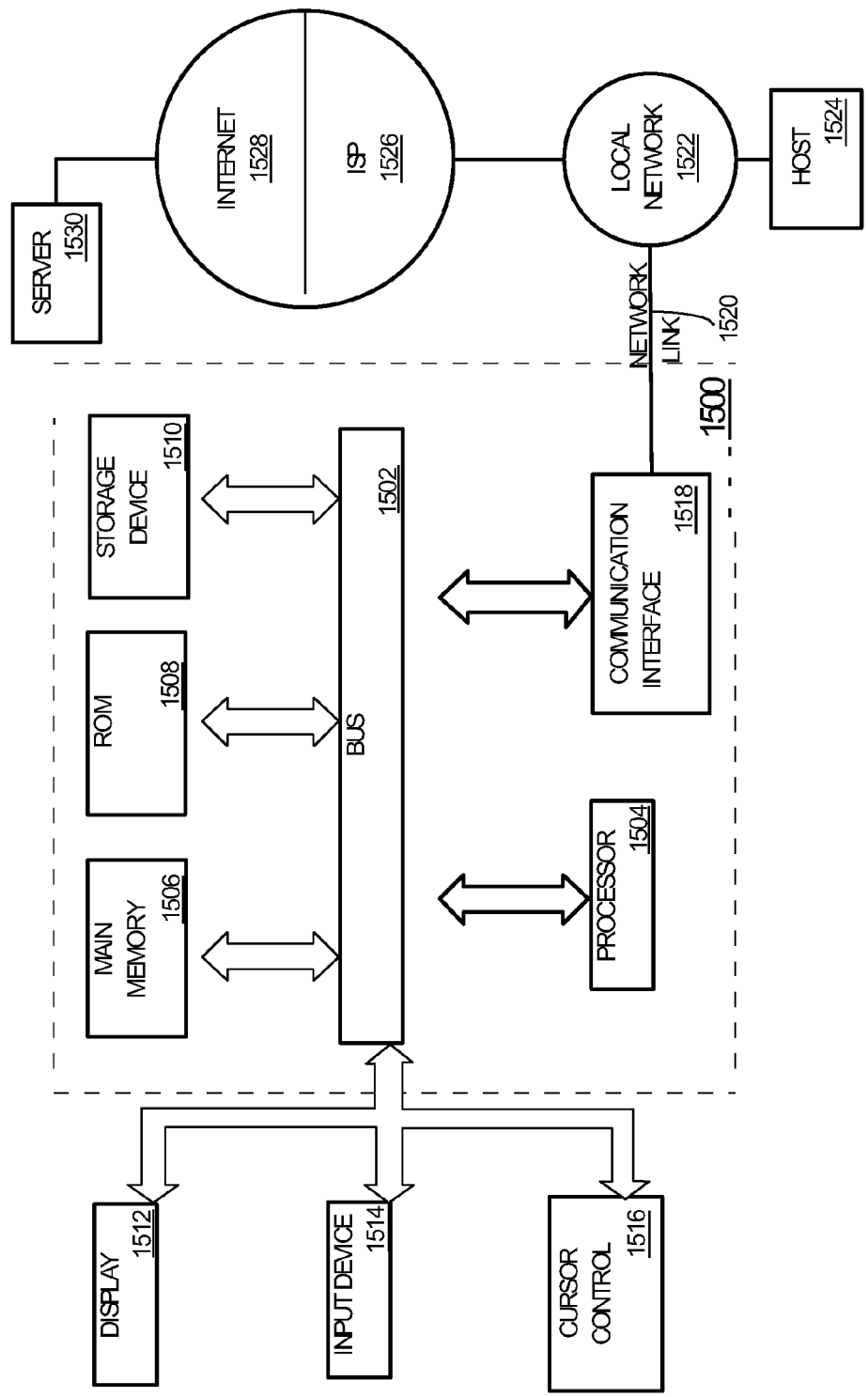
FIG. 15 is a block diagram of a computer system with which embodiments of the present technology may be implemented.

For example, FIG. 15 is a block diagram that illustrates a computer system 1500 upon which an embodiment of the invention may be implemented. Computer system 1500 includes a bus 1502 or other communication mechanism for communicating information, and a hardware processor 1504 coupled with bus 1502 for processing information. Hardware processor 1504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the techniques described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1510. Volatile media includes dynamic memory, such as main memory 1506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution.

What is claimed is:

1. A method comprising:
generating a low frequency information audio signal based on a multichannel audio signal;
synthesizing a haptic signal from the low frequency information audio signal;
wherein synthesizing the haptic signal comprises synthesizing, from the low frequency information audio signal, one or more haptic effect parameters;
providing the one or more haptic effect parameters to a tool for adjusting the one or more haptic effect parameters;
receiving haptic effect metadata reflecting one or more user adjustments made using the tool to at least one of the one or more haptic effect parameters;
embedding the haptic signal and the haptic effect metadata in a multichannel audio codec bit stream that encodes at least the multichannel audio signal;
wherein the method is performed by a computing device.

2. The method of claim 1, wherein generating the low frequency information audio signal comprises extracting a low frequency effects audio channel signal from the multichannel audio signal.

3. The method of claim 1, wherein generating the low frequency information audio signal comprises generating a composite audio signal based on a right audio channel signal, a left audio channel signal, a left surround audio channel audio, a right surround audio channel signal, and a low frequency effects audio channel signal.

4. The method of claim 1, wherein one of the one or more haptic effect parameters is center frequency.

5. The method of claim 1, wherein one of the one or more haptic effect parameters is gain.

6. The method of claim 1, wherein one of the one or more haptic effect parameters is a modulation haptic effect parameter extracted from low frequency information audio signal based on a spectrogram analysis for controlling the temporal characteristics of haptic effects.

7. The method of claim 1, wherein embedding the haptic signal comprises compressing the haptic signal to produce a compressed haptic signal and embedding the compressed haptic signal in the multichannel audio codec bit stream.

8. The method of claim 1, wherein embedding the haptic effect metadata comprises translating the haptic effect metadata to a haptic effect metadata syntax suitable for embedding in the multichannel audio codec bit stream and embedding the haptic effect metadata syntax in the multichannel audio codec bit stream.

9. The method of claim 1, wherein the haptic signal is embedded in the multichannel audio codec bit stream as a monaural channel.

10. The method of claim 1, wherein the tool is a digital audio mixing software application.

11. The method of claim 1, further comprising:
embedding at least a portion of the haptic effect metadata in an auxiliary data field, an addbsi data field, a skip field, or a wastebit field of the multichannel audio codec bit stream.

12. The method of claim 1, further comprising:
formatting the haptic effect metadata for carriage in a metadata container; and
embedding the metadata container carrying the formatted haptic effect metadata in the multichannel audio codec bit stream.

13. The method of claim 12, wherein embedding the metadata container carrying the formatted haptic effect metadata comprises embedding the metadata container carrying the formatted haptic effect metadata in skip fields of syncframes of the multichannel audio codec bit stream.

14. The method of claim 1, further comprising:
formatting the haptic effect metadata for carriage in a dependent substream of the multichannel audio codec bit stream.

15. The method of claim 1, further comprising:
formatting the haptic effect metadata for carriage in an independent substream of the multichannel audio codec bit stream.

16. The method of claim 1, further comprising:
embedding at least a portion of the haptic effect metadata in a data stream bit field or a fil element of the multichannel audio codec bit stream.

17. A method comprising:
receiving a multichannel audio codec bitstream comprising a haptic track and associated haptic effect metadata;
decoding the multichannel audio codec bitstream to produce a multichannel audio signal;
sending the multichannel audio signal to one or more audio output devices;
decoding the haptic track to produce a first haptic signal;
generating a second haptic signal based on the associated haptic effect metadata;
modulating the first haptic signal with the second haptic signal to produce a third haptic signal;
sending the third haptic signal to a haptic actuator;
wherein the method is performed by one or more computing devices.

18. A non-transitory computer-readable media storing instructions which, when executed by a computing device, cause performance of a method as recited in claim 1.

19. A non-transitory computer-readable media storing instructions which, when executed by a computing device, cause performance of a method as recited in claim 17.

* * * * *